US012411501B2

(12) United States Patent
Kanai et al.

(10) Patent No.: US 12,411,501 B2
(45) Date of Patent: Sep. 9, 2025

(54) VEHICLE MANAGEMENT SYSTEM

(71) Applicant: Hitachi Construction Machinery Co., Ltd., Tokyo (JP)

(72) Inventors: Masaki Kanai, Mito (JP); Shinjiro Saito, Kasumigaura (JP); Tosuke Iwanaga, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 18/690,875

(22) PCT Filed: Dec. 26, 2022

(86) PCT No.: PCT/JP2022/048005
§ 371 (c)(1),
(2) Date: Mar. 11, 2024

(87) PCT Pub. No.: WO2023/188650
PCT Pub. Date: Oct. 5, 2023

(65) Prior Publication Data
US 2024/0377842 A1  Nov. 14, 2024

(30) Foreign Application Priority Data

Mar. 30, 2022 (JP) ................................. 2022-054836

(51) Int. Cl.
*H04W 4/44* (2018.01)
*B65G 67/04* (2006.01)
(Continued)

(52) U.S. Cl.
CPC ............. *G05D 1/661* (2024.01); *B65G 67/04* (2013.01); *G05D 1/69* (2024.01); *G06Q 10/08* (2013.01); *H04W 4/44* (2018.02)

(58) Field of Classification Search
CPC .......... G05D 1/661; G05D 1/69; G05D 1/646; G05D 2105/28; G05D 2107/73;
(Continued)

(56) References Cited

U.S. PATENT DOCUMENTS 6,044,312 A     3/2000 Sudo et al.
10,101,740 B2 * 10/2018 Tanaka ............. B60W 60/0025
(Continued)

FOREIGN PATENT DOCUMENTS

AU   2013223220 A1 *  8/2014  ......... B60R 16/0236
CN      114430527 B  *  6/2022
(Continued)

OTHER PUBLICATIONS

English translation of CN 114430527 (Year: 2022).*
(Continued)

*Primary Examiner* — Brodie J Follman
(74) *Attorney, Agent, or Firm* — Crowell & Moring LLP

(57) ABSTRACT

In a case where a travel permission request regarding a queuing zone for a first unmanned vehicle stopped in a queuing zone is received, on the basis of a time length taken for the first unmanned vehicle arriving at a deceleration start position and a time length taken for a second unmanned vehicle positioned in a loading zone going out of the loading zone from reception of a loading completion notification, a travel start time difference after which the second unmanned vehicle goes out of the loading zone before the first unmanned vehicle arrives at a deceleration start position is calculated, a travel start time of the first unmanned vehicle is calculated on the basis of a reception time of the loading completion notification and the travel start time difference, and a travel permission regarding the queuing zone for the first unmanned vehicle is output after the travel start time has come. As a result, it is possible to shorten a time length
(Continued)

required for replacement of unmanned vehicles at a loading position and enhance productivity.

8 Claims, 24 Drawing Sheets

(51) Int. Cl.
*G05D 1/661* (2024.01)
*G05D 1/69* (2024.01)
*G06Q 10/08* (2023.01)

(58) Field of Classification Search
CPC .... G05D 2109/10; G05D 1/225; G05D 1/617; G05D 1/644; G05D 1/651; G05D 1/6987; B65G 67/04; G06Q 10/08; H04W 4/44; B60T 7/16; E21C 47/00; G08G 1/00
See application file for complete search history.

(56) References Cited

U.S. PATENT DOCUMENTS

| | | | |
|---|---|---|---|
| 11,131,082 B2* | 9/2021 | Sherlock | E02F 9/264 |
| 12,060,696 B2* | 8/2024 | Maeda | G05D 1/644 |
| 2012/0296495 A1 | 11/2012 | Ozaki et al. | |
| 2014/0107882 A1* | 4/2014 | Tojima | E02F 9/207 |
| | | | 701/23 |
| 2014/0316633 A1* | 10/2014 | Tsujimoto | G05D 1/0261 |
| | | | 701/23 |
| 2020/0135032 A1* | 4/2020 | Switkes | G05D 1/695 |
| 2023/0384797 A1* | 11/2023 | White, III | G05D 1/0274 |
| 2024/0377842 A1* | 11/2024 | Kanai | G05D 1/651 |

FOREIGN PATENT DOCUMENTS

| | | |
|---|---|---|
| JP | 8-263138 A | 10/1996 |
| JP | 2020-86779 A | 6/2020 |
| WO | WO 2011/090093 A1 | 7/2011 |

OTHER PUBLICATIONS

International Preliminary Report on Patentability (PCT/IB/338 & PCT/IB/373) issued in PCT Application No. PCT/JP2022/048005 dated Oct. 10, 2024, including English translation of Written Opinion (PCT/ISA/237) (5 pages).

International Search Report (PCT/ISA/210) issued in PCT Application No. PCT/JP2022/048005 dated Jan. 31, 2023 with English translation (4 pages).

Japanese-language Written Opinion (PCT/ISA/237) issued in PCT Application No. PCT/JP2022/048005 dated Jan. 31, 2023 with English translation (6 pages).

\* cited by examiner

FIG. 6

| VEHICLE ID | TARGET ROUTE |
|---|---|
| vehicle_1 | node_LP to node_DP |
| vehicle_2 | node_LP to node_DP |
| ... | ... |
| ... | ... |
| ... | ... |
| vehicle_m | node_DP to node_LP |
| vehicle_m+1 | node_DP to node_LP |

FIG. 7

| NODE ID | TRAVEL PERMITTED VEHICLE |
|---|---|
| node_1 | vehicle_1 |
| node_2 | vehicle_1 |
| node_3 | null |
| ... | ... |
| node_n | vehicle_2 |
| node_n+1 | vehicle_3 |
| node_n+2 | null |

FIG. 11
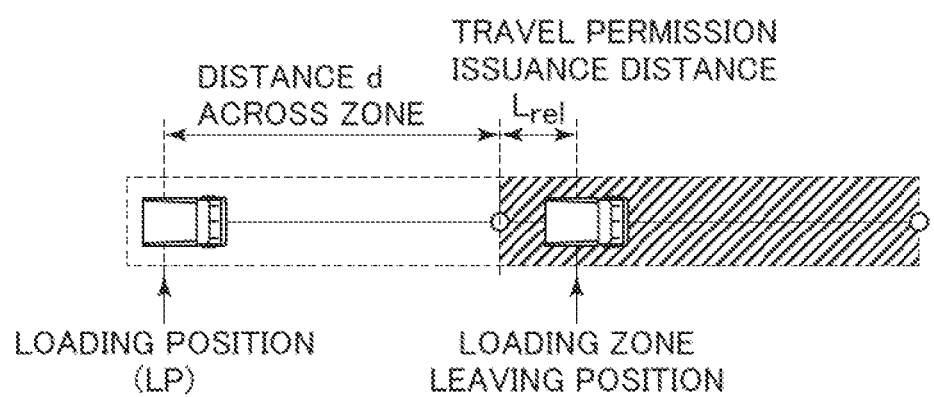
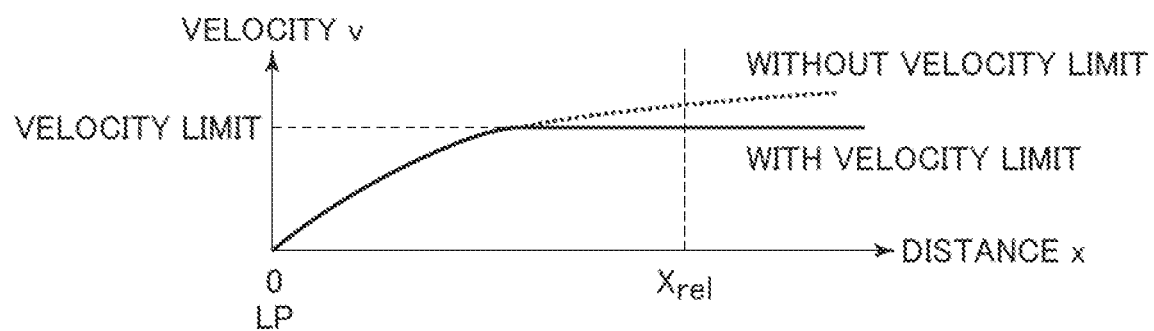

FIG. 13
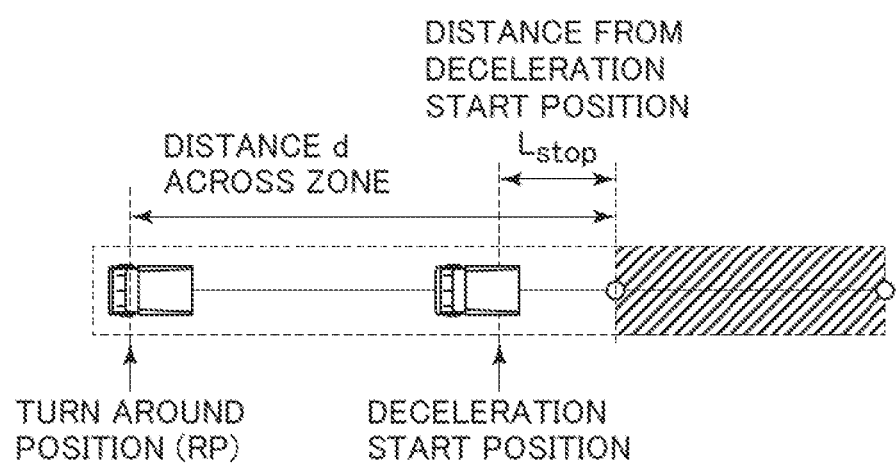
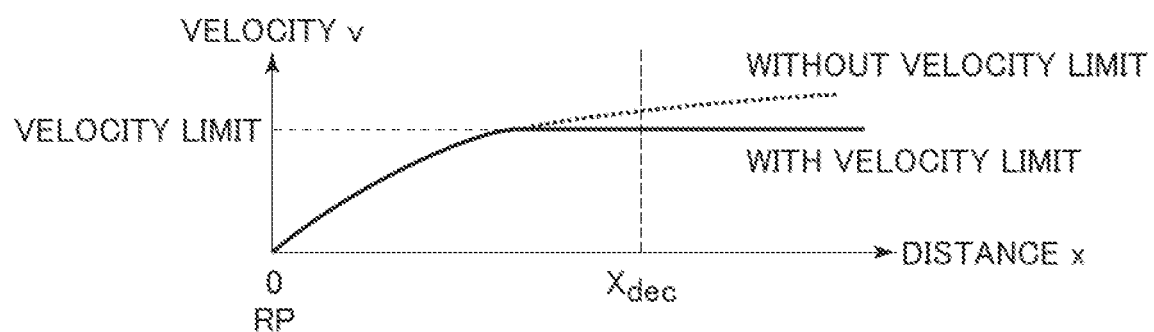

RELATIONSHIP BETWEEN TRAVEL START TIME DIFFERENCE AND TIME LENGTH FOR LEAVING LOADING ZONE / TIME LENGTH FOR ARRIVING AT DECELERATION START POSITION

FIG. 20
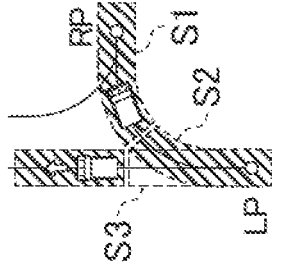
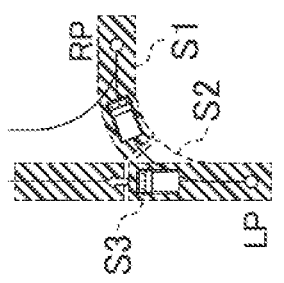
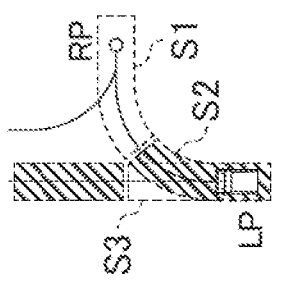
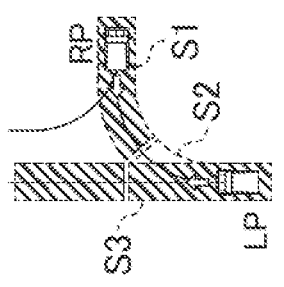

VEHICLE MANAGEMENT SYSTEM

TECHNICAL FIELD

The present invention relates to a vehicle management system.

BACKGROUND ART

At strip mines or the like, vehicle management systems including dump trucks that autonomously travel without operators getting in them (i.e., unmanned vehicles), and a traffic management station that communicates with the unmanned vehicles via a wireless communication line have been used.

As a technology related to vehicle management systems, for example, one described in Patent Document 1 has been known. Patent Document 1 discloses a vehicle travel system that generates a vehicle travel route where a vehicle travels from an entrance point of a loading site to a loading point where there is a loading machine and that causes the vehicle to travel along the generated travel route, the vehicle travel system including travel route generating means that generates a travel route from the entrance point to the loading point through a queuing point near the loading point on the basis of positional information regarding the loading point and positional information regarding the entrance point, first travel control means that causes the vehicle to travel from the entrance point to the queuing point along the travel route generated by the travel route generating means, on the basis of information regarding the travel route, queuing means that causes the vehicle to queue at the queuing point until a permission is obtained from the loading machine, partial travel route generating means that generates a partial travel route from the queuing point to the loading point at a different position changed due to a positional change, on the basis of positional information regarding the loading point at the different position changed due to the positional change and positional information regarding the queuing point on the travel route before the positional change of the loading point in a case where, while the vehicle is queuing at the queuing point or traveling from the entrance point to the queuing point, there is an instruction for the positional change of the loading point from the loading machine to a traffic managing device or/and the vehicle, and second travel control means that causes the vehicle to travel from the queuing point to the loading point along the travel route generated by the travel route generating means, on the basis of the information regarding the travel route, in a case where, while the vehicle is queuing at the queuing point and traveling from the entrance point to the queuing point, there is not the instruction for the positional change of the loading point from the loading machine to the traffic managing device or/and the vehicle, and causes the vehicle to travel from the queuing point to the loading point at the different position changed due to the positional change along the partial travel route generated by the partial travel route generating means, on the basis of information regarding the partial travel route, in a case where, while the vehicle is queuing at the queuing point or traveling from the entrance point to the queuing point, there is the instruction for the positional change of the loading point.

PRIOR ART DOCUMENT

Patent Document

Patent Document 1: WO2011/090093

SUMMARY OF THE INVENTION

Problems to be Solved by the Invention

In the conventional technology described above, on the travel route of the unmanned vehicle, the queuing point like a switchback point is set near the loading point, as a point where the vehicle should queue until a permission is obtained from the loading machine, and the unmanned vehicle is caused to keep traveling to the queuing point, that is, to a position near the loading machine, avoiding stops as much as possible, thereby aiming for enhancement of production efficiency.

However, a queuing point needs to be set at a position well distanced from a loading point to prevent, for example, contact between unmanned vehicles. In particular, since very large-sized unmanned vehicles are operated at a strip mine or the like in many cases and moving distances required for action changes such as acceleration/deceleration of the unmanned vehicles are taken into consideration, a queuing point is set to a position distanced from a loading point to some extent. In addition, in a case where timings of travel start from a queuing point of unmanned vehicles are not taken into consideration as in the conventional technology described above, a time length required for replacement of unmanned vehicles at a loading point becomes long, and the productivity deteriorates undesirably.

The present invention has been made in view of the problems described above, and an object thereof is to provide a vehicle management system that can shorten a time length required for replacement of unmanned vehicles at a loading position and can enhance productivity.

Means for Solving the Problems

The present application includes a plurality of means for solving the problems described above, and an example thereof is a vehicle management system in which a plurality of unmanned vehicles including at least a first unmanned vehicle and a second unmanned vehicle that haul to-be-hauled objects and are capable of traveling autonomously, a loading machine that performs loading work of loading the to-be-hauled objects onto each of the plurality of unmanned vehicles, and a traffic management station that performs traffic management control of the loading machine and the plurality of unmanned vehicles are wirelessly connected to each other in a mutually communicable manner. The vehicle management system includes an unmanned vehicle controller, a loading completion notification input device, and a traffic management controller. The unmanned vehicle controller acquires vehicle body information including positional information representing positions of the plurality of unmanned vehicles at a work site and orientation information representing orientations of the plurality of unmanned vehicles at the work site, controls autonomous traveling of the plurality of unmanned vehicles on the basis of a travel permission for the plurality of unmanned vehicles, and outputs a travel permission request for requesting a travel permission, for each of the plurality of unmanned vehicles, regarding a predetermined travel zone among a plurality of travel zones included in a travel route where the plurality of unmanned vehicles travel. The loading completion notification input device outputs, according to input operation by an operator of the loading machine, a loading completion notification indicating that loading work of loading the to-be-hauled objects onto corresponding one of the unmanned vehicles that is stopped at a loading position preset on the travel route as a position where the loading work is performed by the loading machine for the unmanned vehicles has been completed. The traffic management controller sets a travel route where the plurality of unmanned vehicles travel, on the basis of a work schedule predetermined for the work site and map information including information regarding positions and velocity limits of a plurality of travel routes and that outputs a travel permission regarding a predetermined travel zone of the travel route set for the plurality of unmanned vehicles, on the basis of a travel permission request from the unmanned vehicle controller. The traffic management controller is configured to, in a case where a loading zone which is a travel zone including the loading position and in which only one unmanned vehicle is allowed to enter at once and a queuing zone which is a travel zone adjacent to the loading zone and in which an unmanned vehicle heading toward the loading zone queues are set and where a travel permission request regarding the queuing zone by the first unmanned vehicle stopped in the queuing zone is received, calculate such a travel start time difference between the first unmanned vehicle and the second unmanned vehicle positioned in the loading zone that the second unmanned vehicle goes out of the loading zone a predetermined spare time length before the first unmanned vehicle arrives at a deceleration start position where the first unmanned vehicle should start decelerating for stopping before entering the loading zone, on the basis of a time length for arriving at the deceleration start position that is a time length taken for the first unmanned vehicle arriving at the deceleration start position after starting traveling, and on the basis of a time length for arriving at a loading zone releasing position that is a time length taken for the second unmanned vehicle going out of the loading zone after starting traveling in response to reception of the loading completion notification to the second unmanned vehicle, calculate a travel start time of the first unmanned vehicle on the basis of a reception time of the loading completion notification to the second unmanned vehicle and the travel start time difference, and output a travel permission regarding the queuing zone for the first unmanned vehicle after the travel start time has come.

Advantages of the Invention

According to the present invention, it is possible to shorten a time length required for replacement of unmanned vehicles at a loading position and enhance productivity.

BRIEF DESCRIPTION OF THE DRAWINGS

FIG. 6 is a figure depicting an example of a table of vehicle allocation management information.

FIG. 7 is a figure depicting an example of a table of traffic management information stored on a traffic management information storage section.

FIG. 11 is a figure for explaining a processing principle of the estimation process of estimating the time length for releasing the loading zone.

FIG. 13 is a figure for explaining a processing principle of the estimabtion process of estimating the time length for arriving at the deceleration start position.

FIG. 20 is a figure depicting a state of vehicle management in a conventional technology depicted as a comparative example.

MODES FOR CARRYING OUT THE INVENTION

Hereinbelow, embodiments of the present invention are explained with reference to the figures. Note that, whereas dump trucks as an example of haulage vehicles which are management subjects of a vehicle management system and hydraulic excavators as an example of loading machines which are management subjects of the vehicle management system are depicted and explained in the present embodiments, the present invention can be applied also to a vehicle management system whose management subjects are other haulage vehicles or loading machines.

First Embodiment

A first embodiment of the present invention is explained with reference to FIG. 1 to FIG. 21.

Figure 1:
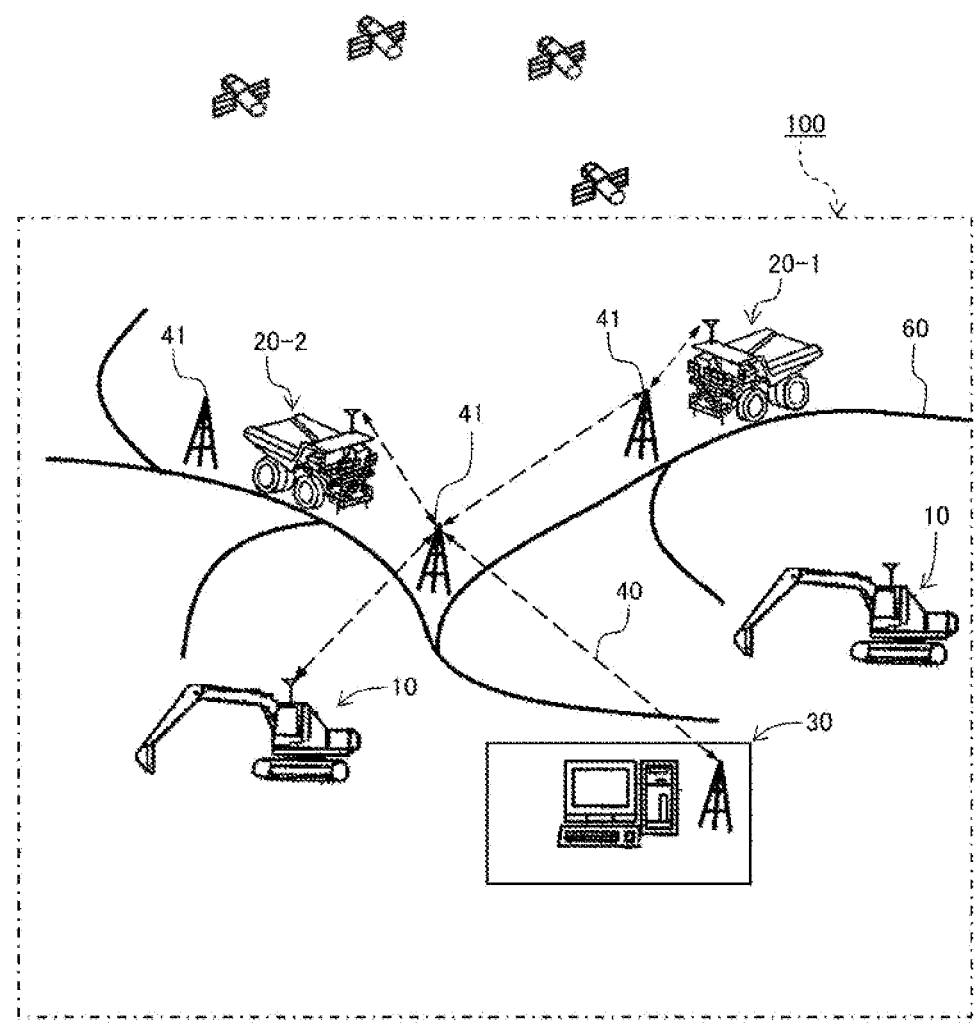
FIG. 1 is a figure depicting the overall configuration of a vehicle management system.

FIG. 1 is a figure depicting the overall configuration of the vehicle management system according to the present embodiment.

As depicted in FIG. 1, a vehicle management system 100 is a system used for work sites such as strip mines, and includes one or more loading machines 10 that perform excavation work and loading work, one or more unmanned vehicles 20 (an unmanned vehicle 20-1 and an unmanned vehicle 20-2) that transport to-be-hauled objects such as earth and sand loaded from the loading machines 10, and a traffic management station 30 that performs vehicle allocation management and traffic management of the unmanned vehicles 20. The loading machines 10, the unmanned vehicles 20, and the traffic management station 30 are configured to be able to communicate with each other by a wireless communication line 40. Specifically, a plurality of wireless base stations 41 are installed at a strip mine or the like, and the loading machines 10, the unmanned vehicles 20, and the traffic management station 30 perform transmission and reception to and from each other via the wireless base stations 41.

In a control scheme used as a traffic management scheme of the traffic management station 30 in the present embodiment, exclusive travel permissions regarding partial zones (travel zones) of a transportation route 60 divided by nodes on map data representing the transportation route 60 are given on the basis of the positions of the respective unmanned vehicles 20 (what is generally called a travel permitted zone control scheme). In the travel permitted zone control scheme, for example, in a case where a subject unmanned vehicle 20 requests a travel permission regarding a travel zone ahead of the subject unmanned vehicle 20 and, at that time, another unmanned vehicle has been given a travel permission regarding the travel zone ahead regarding which the subject unmanned vehicle 20 requests the travel permission or the travel zone ahead is set as an entry prohibited zone, the subject unmanned vehicle 20 is not given the travel permission regarding the travel zone ahead. Accordingly, the subject unmanned vehicle 20 stops at, for example, the end of a currently permitted zone, and queues until the travel permission regarding the travel zone ahead is given.

Figure 2:
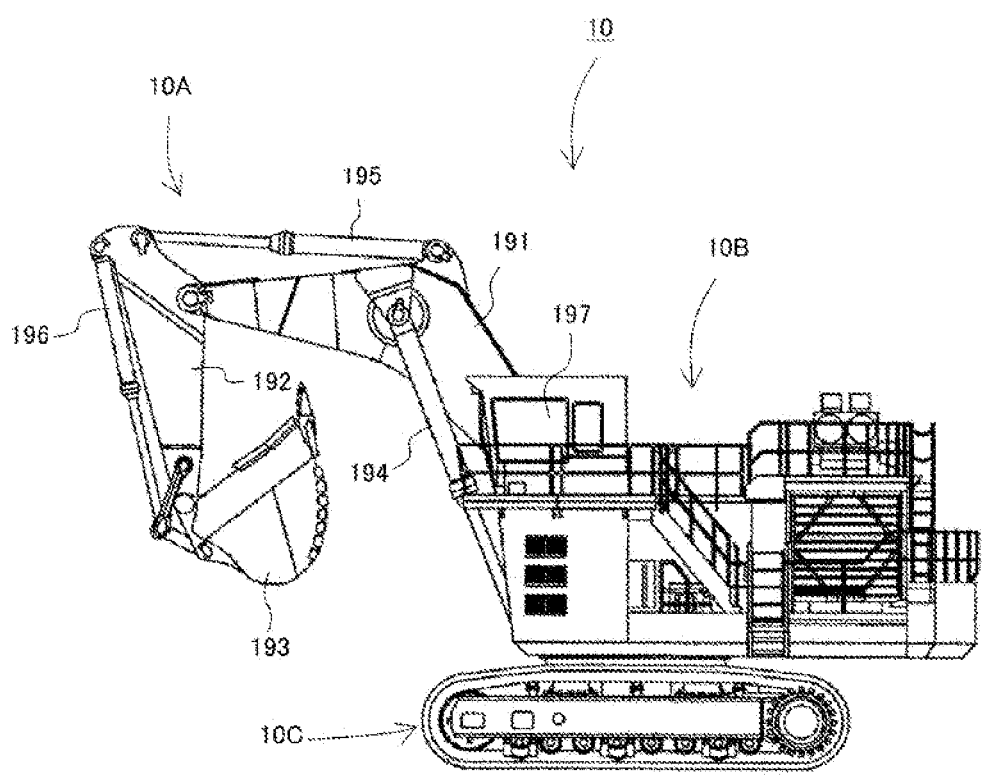
FIG. 2 is a figure depicting the external appearance of a hydraulic excavator depicted as an example of loading machines.

FIG. 2 is a figure depicting the external appearance of a hydraulic excavator depicted as an example of the loading machines. Note that the loading machines 10 are not limited to hydraulic excavators, and may be wheel loaders or the like, for example.

As depicted in FIG. 2, a hydraulic excavator (loading machine) 10 includes an articulated-type front device 10A including a vertically pivotable boom 191, arm 192, and bucket 193 that are linked with each other, an upper swing structure 10B, and a lower travel structure 10C. In addition, an operation room 197 where an operator gets in is arranged at the upper front of the upper swing structure 10B.

The base end of the boom 191 of the front device 10A is supported pivotably by a front section of the upper swing structure 10B, one end of the arm 192 is supported pivotably by an end section (front end) which is different from the base end of the boom 191, and the bucket 193 is supported pivotably by the other end of the arm 192. The boom 191, the arm 192, the bucket 193, the upper swing structure 10B, and the lower travel structure 10C are driven by a boom cylinder 194, an arm cylinder 195, a bucket cylinder 196, an undepicted swing motor, and undepicted left and right travel motors, respectively. Hereinafter, the boom cylinder 194, the arm cylinder 195, the bucket cylinder 196, the swing motor, and the left and right travel motors are collectively referred to as a vehicle body drive system 180 (see FIG. 5 below) in some cases.

Figure 3:
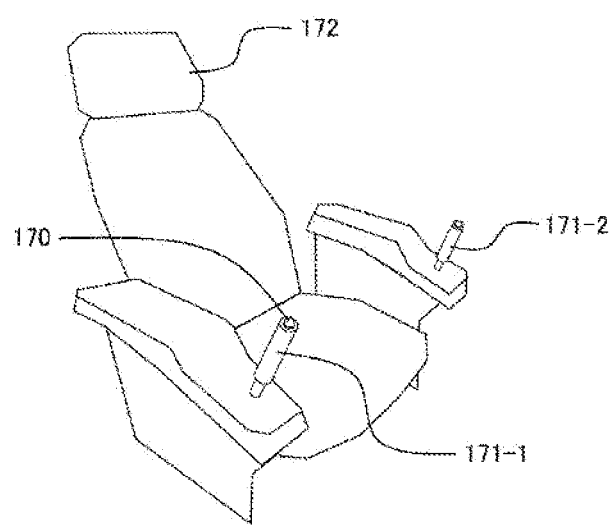
FIG. 3 is a figure depicting an overview of an operator's seat installed in an operation room.

FIG. 3 is a figure depicting an overview of an operator's seat installed in the operation room.

As depicted in FIG. 3, operation levers 171 (a right operation lever 171-1 and a left operation lever 171-2) that output operation signals for operating the hydraulic actuators 194 to 196 or the like are provided at an operator's seat 172 installed in the operation room 197. The operation levers 171 can be inclined forward/backward and leftward/rightward, include undepicted sensors that electrically sense lever inclination amounts, that is, lever operation amounts, which are operation signals, and output, via electric wires, the lever operation amounts sensed by the sensors. That is, operation of each of the hydraulic actuators 194 to 196 or the like is assigned to the forward/backward directions or leftward/rightward directions of the operation levers 171. Hereinafter, the operation levers 171 including the right operation lever 171-1 and the left operation lever 171-2 are referred to as a vehicle body operation input device 171 (see FIG. 5 below) in some cases.

In addition, at a top section of the operation lever 171 (e.g., the right operation lever 171-1), a loading completion notification input device 170 is arranged as a switch that can be quickly operated at any time by, for example, the thumb of a right hand while the operation lever 171 is being gripped.

According to input operation by an operator of the loading machine (hydraulic excavator 10), the loading completion notification input device 170 outputs a loading completion notification indicating that loading work for the unmanned vehicle 20 stopped at a loading position preset on a travel route as a position where the loading machine performs loading work of loading to-be-hauled objects onto the unmanned vehicles 20 is completed.

Note that, for example, it is sufficient if the loading completion notification input device 170 is a switch or the like arranged at the operator's seat 172 such that an operator can easily operate the loading completion notification input device 170, and need not necessarily be a switch arranged at the top section of the operation lever 171. For example, as long as the loading completion notification input device 170 is one that allows an operator to perform input operation while performing normal operation such as loading, the loading completion notification input device 170 may be a device other than a switch, and may not be one arranged at the top section of the operation lever 171.

Figure 4:
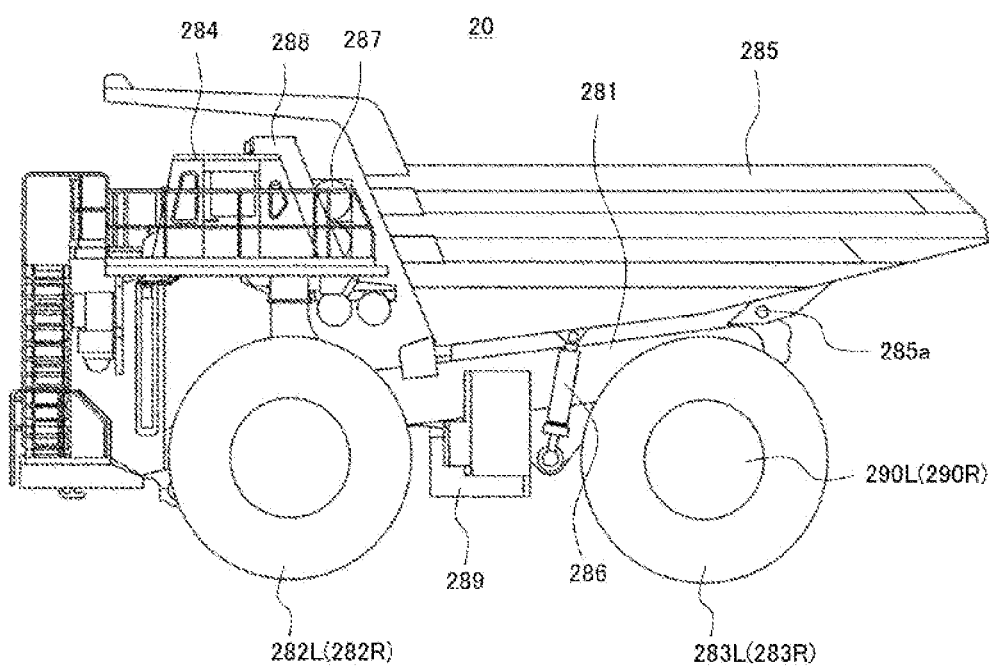
FIG. 4 is a side view schematically depicting the external appearance of a dump truck depicted as an example of unmanned vehicles.

FIG. 4 is a side view schematically depicting the external appearance of a dump truck depicted as an example of the unmanned vehicles (haulage vehicles). Note that, in FIG. 4, only one of a pair of left and right constituent elements such as follower wheels, driving wheels, or travel motors is depicted and given a reference character, and the other is represented only by a reference character in parentheses in the figure but is not depicted.

As depicted in FIG. 4, for example, a dump truck 20 which is an unmanned vehicle is an electrically driven dump truck, and includes, in general, a vehicle body frame 281 that extends in the forward/backward directions and that forms a support structure, a cargo bed (vessel) 285 that is arranged to extend in the forward/backward directions at a top section of the vehicle body frame 281 and that has a lower rear end section provided to the vehicle body frame 281 to be able to be inclined via a pin-joining section 285a, a pair of follower wheels (front wheels) 282L and 282R that are provided on the left side and right side at the lower front of the vehicle body frame 281, a pair of driving wheels (rear wheels) 283L and 283R provided on the left side and right side at the lower back of the vehicle body, an operation room 284 provided at the upper front of the vehicle body frame 281, a fuel tank 289 provided below the vehicle body frame 281, an engine (not depicted) that is arranged on the vehicle body frame 281 and that is driven by a fuel supplied from the fuel tank 289, and an electric drive system having, for example, travel motors 290L and 290R that drive the wheels (driving wheels 283L and 283R) by using electric power output from an electric power generator connected to and driven by the engine. The travel motors 290L and 290R are housed in rotation shaft sections of the driving wheels 283L and 283R along with undepicted velocity reduction gears. The vehicle body frame 281 and the cargo bed 285 are connected to each other by a hoist cylinder 286, and the cargo bed 285 is pivoted about the pin-joining section 285a by expansion and contraction of the hoist cylinder 286.

Figure 5:
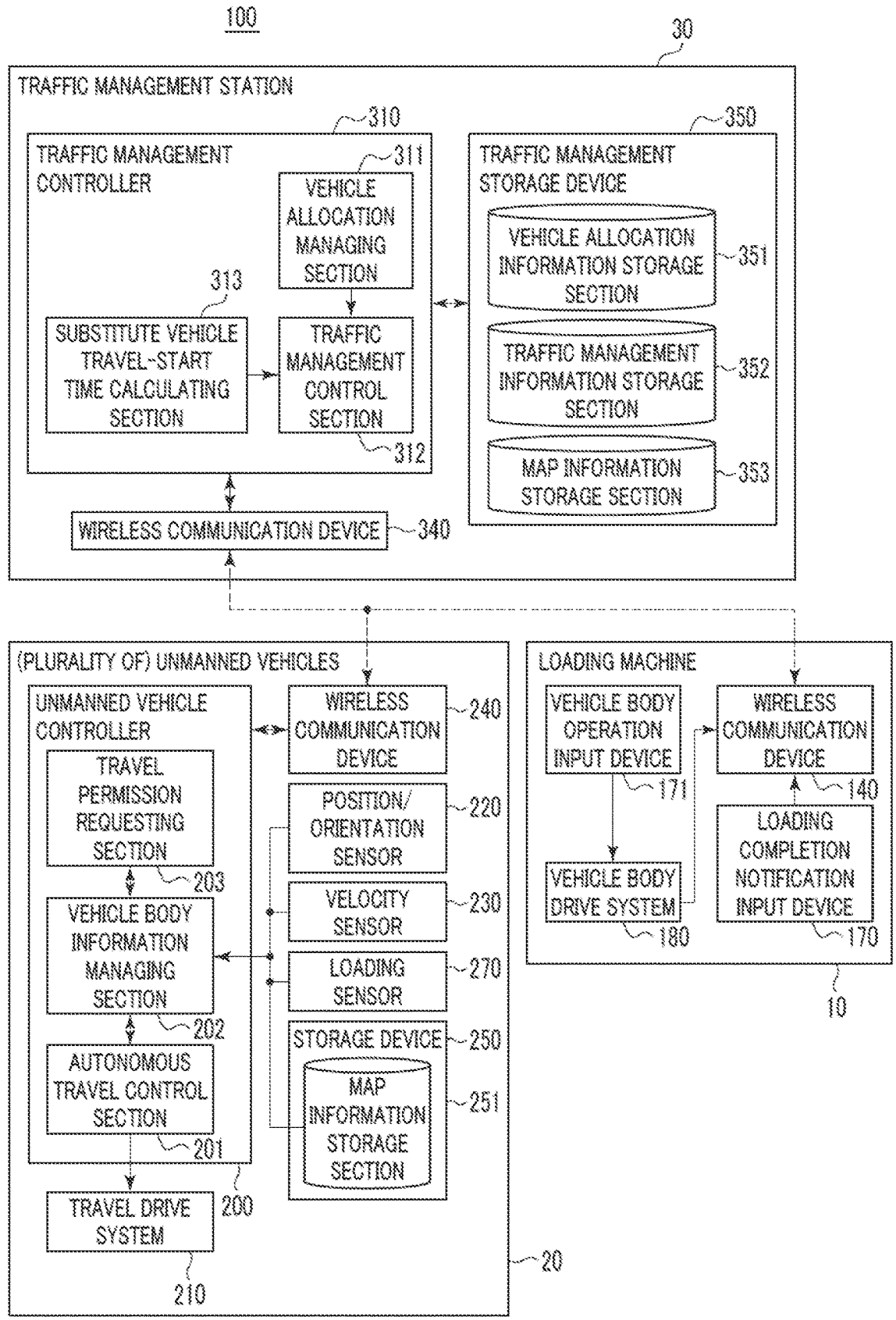
FIG. 5 is a functional block diagram depicting the vehicle management system.

FIG. 5 is a functional block diagram depicting the vehicle management system.

As depicted in FIG. 5, the vehicle management system 100 includes a plurality of unmanned vehicles 20 that haul to-be-hauled objects such as earth and sand and are capable of traveling autonomously, a loading machine 10 that performs loading work of loading the to-be-hauled objects onto each of the plurality of unmanned vehicles 20, and the traffic management station 30 that performs traffic management control of the loading machine 10 and the plurality of unmanned vehicles 20. The plurality of unmanned vehicles 20, the loading machine 10, and the traffic management station 30 are wirelessly connected to each other in a mutually communicable manner.

An unmanned vehicle controller 200 is arranged for each of the plurality of unmanned vehicles 20. The unmanned vehicle controller 200 acquires vehicle body information including positional information representing the position of the unmanned vehicle 20 at a work site and orientation information representing the orientation of the unmanned vehicle 20 at the work site, controls autonomous traveling of the unmanned vehicle 20 on the basis of a travel permission for the unmanned vehicle 20, and outputs a travel permission request for requesting a travel permission regarding a predetermined travel zone among a plurality of travel zones included in a travel route where the unmanned vehicle 20 travels.

The loading completion notification input device 170 is arranged in the loading machine 10. According to the input operation by an operator of the loading machine 10, the loading completion notification input device 170 outputs a loading completion notification indicating that loading work for the unmanned vehicle 20 stopped at a loading position preset on a travel route as a position where the loading machine 10 performs loading work of loading to-be-hauled objects onto the unmanned vehicles 20 is completed.

A traffic management controller 310 is arranged in the traffic management station 30. The traffic management controller 310 sets a travel route where the plurality of unmanned vehicles 20 travel on the basis of a predetermined work schedule of the work site and map information including information regarding the positions and velocity limits of a plurality of travel routes, and outputs a travel permission regarding a predetermined travel zone of the travel route set for the plurality of unmanned vehicles 20, on the basis of a travel permission request from an unmanned vehicle controller 200.

Note that one loading machine 10 and one unmanned vehicle 20 are depicted in FIG. 5, but, also in a case where there are two or more loading machines 10 and two or more unmanned vehicles 20, they have similar configurations.

(Loading Machine 10)

The loading machine 10 includes the vehicle body operation input device 171, the vehicle body drive system 180, the loading completion notification input device 170, and a wireless communication device 140.

For example, the wireless communication device 140 is radio equipment for connection to the wireless communication line 40. The wireless communication device 140 performs information transmission and reception to and from the unmanned vehicles 20 or the traffic management station 30 via the wireless communication line 40.

The vehicle body operation input devices 171 are the operation levers 171-1 and 171-2, and are provided at the operator's seat 172.

The vehicle body drive system 180 is the boom cylinder 194, the arm cylinder 195, the bucket cylinder 196, the swing motor, and the left and right travel motors, and is driven according to operation signals from the vehicle body operation input devices 171. In addition, the vehicle body drive system 180 is provided with an undepicted inertial measurement unit (IMU), and can transmit postural information regarding the vehicle body drive system 180 or the number of times of loading obtained from the postural information to the unmanned vehicles 20 or the traffic management station 30 via the wireless communication device 140.

According to input operation by an operator of the loading machine (hydraulic excavator 10), the loading completion notification input device 170 outputs a loading completion notification indicating that loading work for the unmanned vehicle 20 stopped at a loading position preset on a travel route as a position where the loading machine performs loading work of loading to-be-hauled objects onto the unmanned vehicles 20 is completed. The loading completion notification from the loading completion notification input device 170 is transmitted to the unmanned vehicle 20 or the traffic management station 30 via the wireless communication device 140.

The overall action of the loading machine 10 is controlled by an undepicted controller. For example, the controller of the loading machine 10 is configured by a microcomputer which is a combination of a CPU (Central Processing Unit) that executes computations, a ROM (Read Only Memory) as a secondary storage device having recorded thereon a program for the computations, and a RAM (Random Access Memory) as a transitory storage device that stores intermediate results of the computations and stores temporary control variables. The controller of the loading machine 10 controls actions of the loading machine 10 by execution of the stored program.

(Unmanned Vehicles 20)

The unmanned vehicle 20 includes the unmanned vehicle controller 200, a travel drive system 210, a position/orientation sensor 220, a velocity sensor 230, a loading sensor 270, a storage device 250, and a wireless communication device 240.

The travel drive system 210 drives traveling of the unmanned vehicle 20 on the basis of control signals of the unmanned vehicle controller 200. For example, the travel drive system 210 includes a steering motor for changing the steering angle of the unmanned vehicle 20, the travel motors 290L and 290R for causing the unmanned vehicle 20 to travel, a brake, and the like.

For example, the position/orientation sensor 220 is a GPS (Global Positioning System) device, a magnetic sensor, or the like. The position/orientation sensor 220 measures the position and orientation of the subject unmanned vehicle 20, and outputs the measured position and orientation to the unmanned vehicle controller 200. Note that the position/orientation sensor 220 may be a combination of a GPS and an inertial measurement unit (IMU), or one that identifies the position by using radio waves from base stations installed on the ground.

The loading sensor 270 measures the weight of objects loaded on the unmanned vehicle 20 (i.e., a loaded amount). The loading sensor 270 may be a weight sensor included at a seat portion of the vessel (cargo bed) 285, or may be one that estimates the weight on the basis of the pressure of the hoist cylinder 286 that cause the vessel 285 to perform an action. The loading sensor 270 outputs the measured loaded amount to the unmanned vehicle controller 200.

The storage device 250 is a non-volatile storage medium from which information can be read out and on which information can be written. The storage device 250 has stored thereon an OS (Operating System) and various types of control programs, application program, database, and the like. In addition, a storage region as a map information storage section 251 is formed on the storage device 250. The map information storage section 251 stores a work schedule predetermined for a work site and map information including information regarding the positions and velocity limits of a plurality of travel routes.

For example, the wireless communication device 240 is radio equipment for connection to the wireless communication line 40. The wireless communication device 240 performs information transmission and reception to and from the loading machine 10 or the traffic management station 30 via the wireless communication line 40.

For example, the unmanned vehicle controller 200 is configured by a microcomputer which is a combination of a CPU (Central Processing Unit) that executes computations, a ROM (Read Only Memory) as a secondary storage device having recorded thereon a program for the computations, and a RAM (Random Access Memory) as a transitory storage device that stores intermediate results of the computations and stores temporary control variables. The unmanned vehicle controller 200 controls actions of the unmanned vehicle 20 by execution of the stored program.

The unmanned vehicle controller 200 has an autonomous travel control section 201, a vehicle body information managing section 202, and a travel permission requesting section 203. The vehicle body information managing section 202 manages information regarding the position and orientation output from the position/orientation sensor 220 and information regarding the loaded amount output from the loading sensor 270, and transmits these pieces of information to the traffic management station 30 via the wireless communication device 240. In addition, the vehicle body information managing section 202 outputs information regarding the position, orientation and loaded amount to the autonomous travel control section 201. Further, in a case where the vehicle body information managing section 202 has received information regarding a travel route and a travel permitted zone for the subject unmanned vehicle 20 from a traffic management control section 312 (described later) of the traffic management station 30, the vehicle body information managing section 202 outputs the received information to the autonomous travel control section 201.

On the basis of the information regarding the position, orientation, loaded amount, travel route, and travel permitted zone output from the vehicle body information managing section 202, the autonomous travel control section 201 generates control signals such as acceleration/deceleration control signals or steering control signals for causing the unmanned vehicle 20 to travel such that the unmanned vehicle 20 does not deviate from the travel permitted zone while following the travel permitted route. Further, the autonomous travel control section 201 outputs these generated control signals to the travel drive system 210.

(Traffic Management Station 30)

The traffic management station 30 includes the traffic management controller 310, a traffic management storage device 350, and a wireless communication device 340.

The traffic management storage device 350 is a non-volatile storage medium from which information can be read out and on which information can be written. The traffic management storage device 350 has stored thereon an OS (Operating System) and various types of control programs, application program, database, and the like. Storage regions as a vehicle allocation management information storage section 351, a traffic management information storage section 352, and a map information storage section 353 are formed on the traffic management storage device 350.

For example, the wireless communication device 340 is radio equipment for connection to the wireless communication line 40. The wireless communication device 340 performs information transmission and reception to and from the loading machine 10 or the unmanned vehicles 20 via the wireless communication line 40.

For example, the traffic management controller 310 is configured by a microcomputer which is a combination of a CPU (Central Processing Unit) that executes computations, a ROM (Read Only Memory) as a secondary storage device having recorded thereon a program for the computations, and a RAM (Random Access Memory) as a transitory storage device that stores intermediate results of the computations and stores temporary control variables. The traffic management controller 310 controls actions of the traffic management station 30 by execution of the stored program.

The traffic management controller 310 has a vehicle allocation managing section 311, the traffic management control section 312, and a substitute vehicle travel-start time calculating section 313.

The vehicle allocation managing section 311 sets a travel route to a destination of the unmanned vehicles 20. For example, in a case where the unmanned vehicle 20 is at a loading position, the vehicle allocation managing section 311 sets a travel route to a soil-dropping position. On the other hand, in a case where the unmanned vehicle 20 is at a soil-dropping position, the vehicle allocation managing section 311 sets a travel route to a loading position. Then, travel routes set by the vehicle allocation managing section 311 are stored on the vehicle allocation management information storage section 351 in, for example, a table format as vehicle allocation management information.

FIG. 6 is a figure depicting an example of a table of the vehicle allocation management information.

As depicted in FIG. 6, in the vehicle allocation management information, a travel route set by the vehicle allocation managing section 311 is recorded as a target route for each vehicle ID uniquely identifying the unmanned vehicle 20. The target route represents a route from a loading position (node_LP) to a soil-dropping position (node_DP) or from the soil-dropping position (node_DP) to the loading position (node_LP).

As for target routes, map information that can be preset as travel routes like a transportation route between work areas where loading work or soil-dropping work is performed is stored on the map information storage section 353 in a format in line with the shapes of the transportation routes in advance. On the other hand, map information that cannot be preset as travel routes like a travel zone including work points such as a loading position, a queuing position, or a soil-dropping position is generated by the traffic management control section 312 when a loading position or a soil-dropping position, which is a work point, is specified, and is stored on the map information storage section 353. Note that only one piece or a plurality of pieces of information may be generated as the map information generated by the traffic management control section 312. In a case where a plurality of pieces of information are generated, the vehicle allocation managing section 311 selects one of the plurality of pieces of map information when a travel route is to be set for the unmanned vehicle 20.

In addition, in a case where there is map information having been generated for a destination work area, when a travel route is to be set for the unmanned vehicle 20, the vehicle allocation managing section 311 sets a travel route between work areas and a travel route in the work areas simultaneously. On the other hand, in a case where there is not map information having been generated for a destination work area, it is sufficient if the vehicle allocation managing section 311 first sets a travel route to the entrance point of a destination work area and, at a time point when a work point such as a loading position, a queuing position, or a soil-dropping position in the work area has been specified, sets a travel route in the work area.

On the basis of information regarding traffic management stored on the traffic management information storage section 352 (hereinafter, simply referred to as "traffic management information"), the traffic management control section 312 sets each of a plurality of travel zones set for travel routes of the unmanned vehicles 20 as a travel permitted zone regarding which a travel permission is given to only any one of the plurality of unmanned vehicles 20. That is, there is only one unmanned vehicle 20 to which a travel permission regarding each travel zone of a plurality of travel zones is given, and there can never be a case where there are a plurality of the unmanned vehicles 20 that are given a travel permission regarding one travel zone.

FIG. 7 is a figure depicting an example of a table of the traffic management information stored on the traffic management information storage section.

In the traffic management information, each node ID and a "travel permitted vehicle" representing the unmanned vehicle to which a travel permission regarding a travel zone (a travel zone to the next node on a route) represented by the node ID is given are associated with each other. As a travel permitted zone for the unmanned vehicle 20, the traffic management control section 312 sets a zone ahead where the unmanned vehicle 20 can be permitted to travel, according to the position of the unmanned vehicle 20. The unmanned vehicle 20 travels according to the node for the set zone.

In the present embodiment, the travel permitted zone control scheme is adopted. Accordingly, in a case where a travel zone ahead of a travel permitted zone which has been set for a certain unmanned vehicle 20-1 is set as a travel permitted zone for another unmanned vehicle 20-2, the traffic management control section 312 does not give, to the unmanned vehicle 20-1, a travel permission regarding the travel zone ahead. In this case, the unmanned vehicle 20-1 stops in such a manner as not to pass the end node of the travel permitted zone which is currently permitted, and queues until a travel permission regarding the zone ahead is given.

In addition, the traffic management control section 312 generates map information on the basis of work points specified in a work area, and causes the generated map information to be stored on the map information storage section 353.

Figure 8:
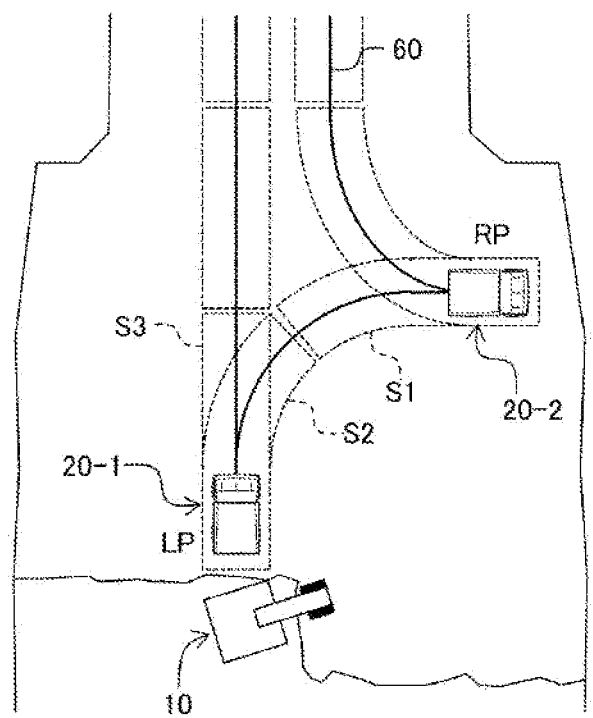
FIG. 8 is a figure depicting an example of a travel route set for a work area where loading work is performed.

FIG. 8 is a figure depicting an example of a travel route set for a work area where loading work is performed. As depicted in FIG. 8, in a case where a loading position (LP: Loading Point) (node_LP) is specified, the traffic management control section 312 generates a travel route 60 in the work area. The travel route 60 includes a plurality of travel zones including travel zones S1, S2, and S3.

For example, the loading position (node_LP) is specified by the traffic management control section 312 on the basis of positional information regarding a loading machine 10 or the like. In addition, according to a positional relationship with the loading position, a queuing position (node_RP) where the following unmanned vehicle 20-2 queues in a case where the other unmanned vehicle 20-1 is positioned at the loading position is specified by the traffic management control section 312. Note that, in the case illustrated in the present embodiment, the loading position and the queuing position are set as turn around positions where the unmanned vehicles 20 turn around to switch to forward movement or backward movement.

When the traffic management control section 312 specifies the loading position (node_LP) and the queuing position (node_RP), the traffic management control section 312 generates map information for allowing the unmanned vehicles 20 to travel, on the basis of undepicted nodes set at the entrance and exit of the work area, the queuing position (node_RP), and the loading position (node_LP).

In the travel route 60 depicted in FIG. 8, the travel zone S1 including the queuing position is the queuing zone S1 where the unmanned vehicle 20-2 heading toward the loading position queues, and includes a queuing position RP set as a turn around position. In addition, the travel zones S2 and S3 are a loading zone from the queuing zone to the loading position and an exit zone for the unmanned vehicle 20-1 to exit the loading position, respectively, and include the loading position LP set as a turn around position between the loading zone S2 and the exit zone S3. That is, the loading zone S2 and the exit zone S3 overlap at the loading position, and a common travel permission is given regarding the loading zone S2 and the exit zone S3, in the case considered here. That is, only one unmanned vehicle can enter the travel zones S2 and S3 at once. Accordingly, unless particular distinctions are made, the loading zone S2 is assumed to include the exit zone S3.

Note that there are various possible map information generation methods. For example, map generation is performed by searching for an appropriate route on the basis of an index such as shortest route length from candidates of combinations of straight lines or arcs which are partial elements of a travel route, within an area in the work area in which generation of a travel route is tolerated.

In addition, as for a work area where soil-dropping work is performed, the traffic management control section 312 generates map information similarly on the basis of a specified soil-dropping position. In that case, the soil-dropping position may be specified by an operator of a bulldozer or the like performing work in the work area or an operator who performs remote operation at the traffic management station 30.

In a case where the substitute vehicle travel-start time calculating section 313 has received a travel permission request regarding the queuing zone S2 from the unmanned vehicle 20-2 stopped and queuing at the queuing position of the queuing zone S1, the substitute vehicle travel-start time calculating section 313 outputs a travel permission regarding the queuing zone S1 to the unmanned vehicle 20-2 by a procedure like the one described below.

First, the substitute vehicle travel-start time calculating section 313 calculates a time length taken for the unmanned vehicle 20-2 (a first unmanned vehicle) arriving at a deceleration start position where the unmanned vehicle 20-2 should start decelerating for stopping before entering the loading zone S2 after starting traveling from the queuing position.

In addition, the substitute vehicle travel-start time calculating section 313 calculates a time length for arriving at a loading zone releasing position which is a time length taken for the unmanned vehicle 20-1 (a second unmanned vehicle) positioned in the loading zone S2 going out of the exit zone S3 after starting traveling from the loading position in response to reception of a loading completion notification to the unmanned vehicle 20-1.

Subsequently, the substitute vehicle travel-start time calculating section 313 calculates, on the basis of the time length taken for arriving at the deceleration start position and the time length for arriving at the loading zone releasing position, such a travel start time difference between the unmanned vehicle 20-1 and the unmanned vehicle 20-2 that the unmanned vehicle 20-1 goes out of the exit zone S3 a predetermined spare time length before the unmanned vehicle 20-2 arrives at the deceleration start position.

Then, the substitute vehicle travel-start time calculating section 313 calculates a travel start time of the unmanned vehicle 20-2 on the basis of a reception time of the loading completion notification to the unmanned vehicle 20-1 and the travel start time difference, and, after the travel start time has come, outputs a travel permission regarding the queuing zone S1 for the unmanned vehicle 20-2 (which can be said to include a travel start permission to start traveling from the queuing position here).

Note that the travel permission request regarding the loading zone S2 is also issued from the following unmanned vehicle 20-2 simultaneously with a travel permission request regarding the queuing zone S1, and, simultaneously with the timing at which the preceding unmanned vehicle 20-1 goes out of the exit zone S3, a travel permission regarding the loading zone S2 for the unmanned vehicle 20-2 (which can be said to include an entry permission to allow entry into the loading zone S2 from the queuing zone S1 here) is output.

Hereinbelow, details of a process performed by the traffic management controller 310 are explained in detail.

Figure 9:
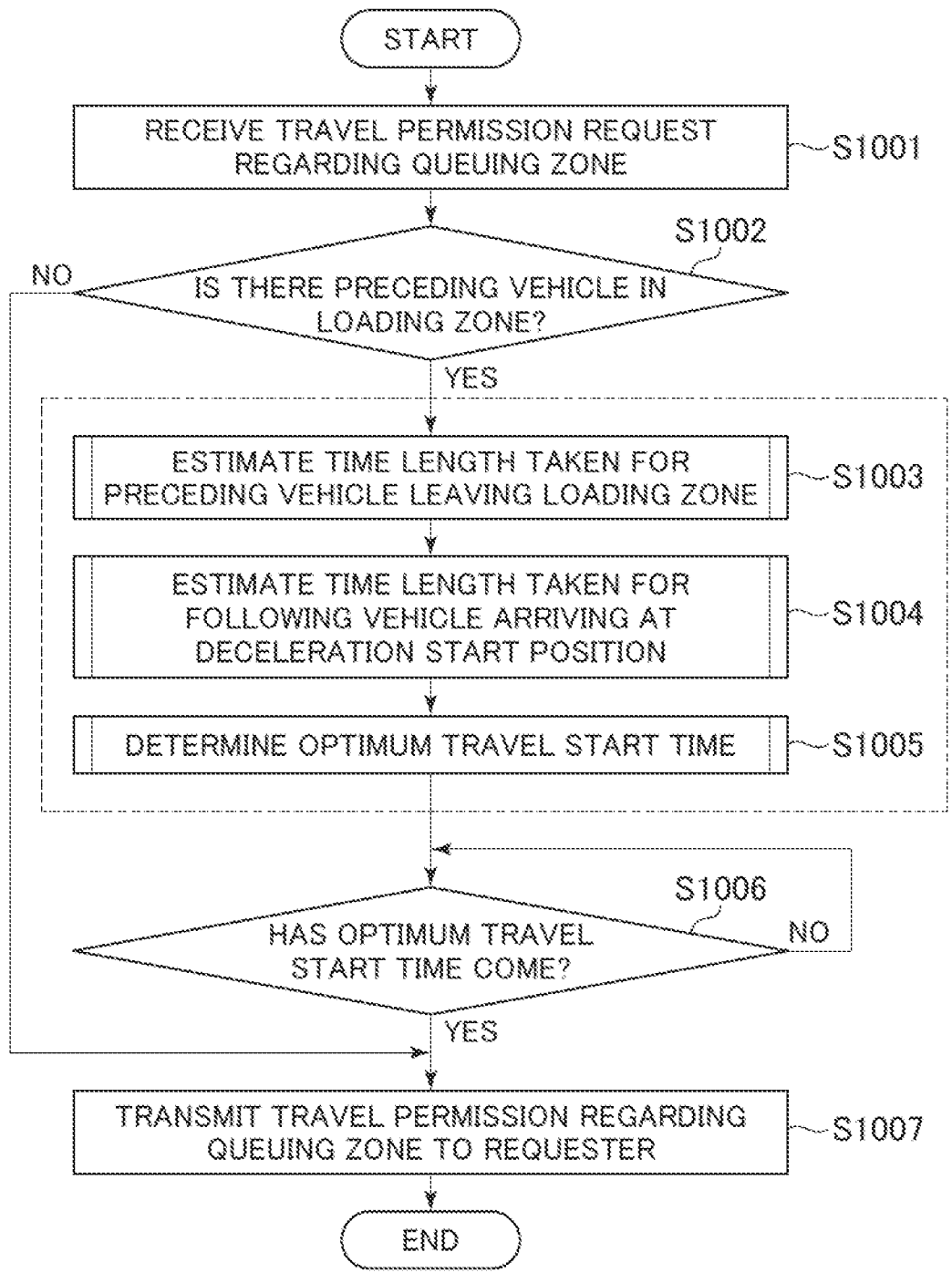
FIG. 9 is a flowchart depicting the processing content of a process of giving permission of travel start, the process being performed by a traffic management controller.

FIG. 9 is a flowchart depicting the processing content of a process of giving permission of travel start, the process being performed by the traffic management controller.

In FIG. 9, when the traffic management controller 310 receives a travel permission request regarding the queuing zone S1 from the unmanned vehicle 20-2 stopped at the queuing position of the queuing zone S1 (Step S1001), the traffic management controller 310 assesses whether or not there is the preceding unmanned vehicle 20-1 in the loading zone S2 (Step S1002). In a case where the assessment result is NO, that is, in a case where there is not the preceding unmanned vehicle 20-1 in the loading zone, the traffic management controller 310 transmits a travel permission regarding the queuing zone S1 to the unmanned vehicle 20-2 (Step S1007), and ends the process.

In addition, in a case where the result of the assessment in Step S1002 is YES, that is, in a case where there is the preceding unmanned vehicle 20-1 in the loading zone S2, the substitute vehicle travel-start time calculating section 313 implements an estimation process of estimating a time length which is taken for the preceding unmanned vehicle 20-1 going out of the exit zone S3 and after which the loading zone S2 is released (Step S1003), implements an estimation process of estimating a time length taken for the unmanned vehicle 20-2 arriving at a deceleration start position where the unmanned vehicle 20-2 should start decelerating for stopping before entering the loading zone S2 after starting traveling from the queuing position (Step S1004), and implements a travel start time determination process of determining a travel start time of the unmanned vehicle 20-2 on the basis of a reception time of the loading completion notification to the unmanned vehicle 20-1 and a travel start time difference (Step S1005).

Subsequently, the traffic management controller 310 assesses whether or not the travel start time calculated in Step S1005 has come (Step S1006), and, in a case where the assessment result is NO, repeats the process in Step S1006 until the assessment result becomes YES, that is, until the travel start time has come. In addition, in a case where the assessment result in Step S1006 is YES, that is, in a case where the travel start time has come, a travel permission regarding the queuing zone S1 is transmitted to the unmanned vehicle 20-2 (Step S1007), and the process is ended.

Figure 10:
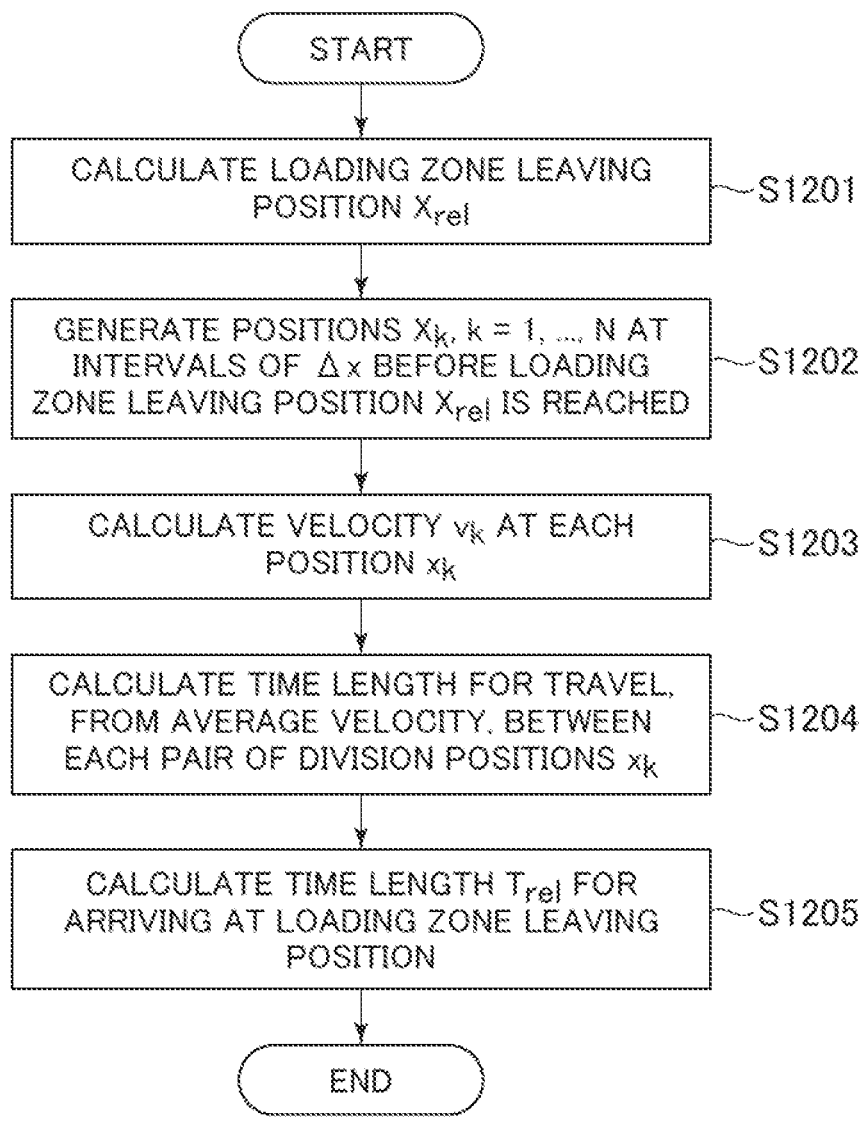
FIG. 10 is a flowchart depicting the processing content of an estimation process of estimating a time length for releasing a loading zone.

FIG. 10 is a flowchart depicting the processing content of the estimation process of estimating the time length for releasing a loading zone. In addition, FIG. 11 is a figure for explaining a processing principle of the estimation process of estimating the time length for releasing the loading zone.

As depicted in FIG. 10 and FIG. 11, in the estimation process of estimating the time length for releasing the loading zone, a loading zone releasing position xrel is calculated (Step S1201), positions x (k=1, . . . , N) at intervals of $\Delta x$ before the loading zone releasing position xrel is reached are generated (Step S1202), a velocity vk at each position xk is calculated (Step S1203), a time length for travel between each pair of the division positions xk is calculated from an average velocity (Step S1204), a time length Trel for arriving at the loading zone releasing position, that is, a time length for releasing the loading zone, is calculated (Step S1205), and the process is ended.

Note that, assuming that the acceleration (which is assumed to be constant) is $\alpha$, a delay at the time of starting traveling from LP is TLPdel, a travel permission releasing margin is Lrel, and the velocity limit is vlim(x), each numerical value is calculated in the following manner.

Loading zone releasing position: xrel=d+Lrel
Each of positions at intervals of distance Δx: kΔx (k=0, ..., N, N=xrel/Δx (rounded up))
Velocity at each xk: vk=min (√2αxk, vlim(xk))
Time length for arriving at xrel:

$$Tre1 = TLPdel + \Sigma(2\Delta x/(vk + v(k+1)))\ (k = 0, ..., N-1)$$

Figure 12:
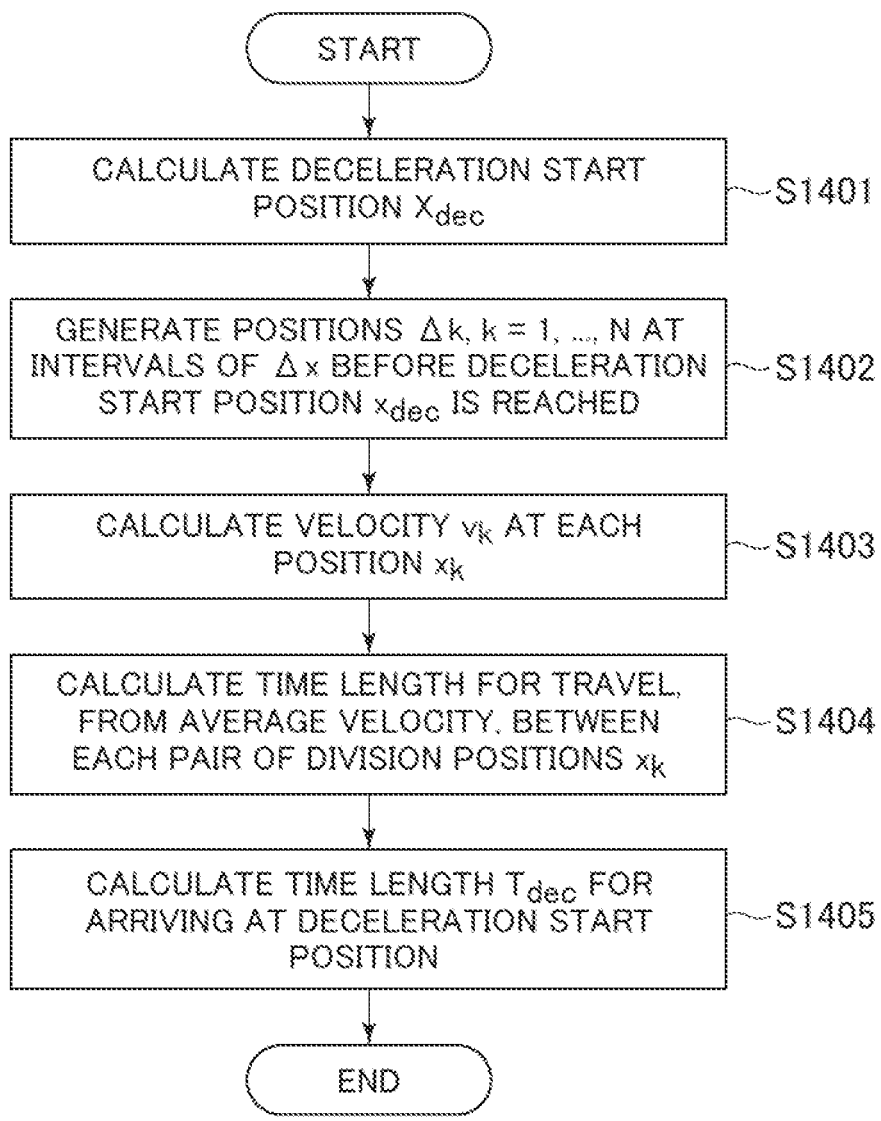
FIG. 12 is a flowchart depicting the processing content of an estimation process of estimating a time length for arriving at a deceleration start position.

FIG. 12 is a flowchart depicting the processing content of the estimation process of estimating a time length for arriving at the deceleration start position. In addition, FIG. 13 is a figure for explaining a processing principle of the estimation process of estimating the time length for arriving at the deceleration start position.

As depicted in FIG. 12 and FIG. 13, in the estimation process of estimating the time length for arriving at the deceleration start position, a deceleration start position xdec is calculated (Step S1401), positions xk (k=1, ..., N) at intervals of Δx before the deceleration start position xdec are generated (Step S1402), the velocity vk at each position xk is calculated (Step S1403), a time length for travel between each pair of the division positions xk is calculated from an average velocity (Step S1404), a time length Tdec for arriving at the deceleration start position is calculated (Step S1405), and the process is ended.

Note that, assuming that the acceleration (which is assumed to be constant) is α, a delay at the time of starting traveling from RP is TRPdel, the loading zone entry velocity is v0, the deceleration (which is assumed to be constant) is β, a stop margin is Lmargin, and the velocity limit is vlim (x), each numerical value is calculated in the following manner.

Deceleration start position: xdec=df−(v0⎯2/2β+Lmargin)
Each of positions at intervals of distance Δx: kΔx (k=0, ..., N, N=xrel/Δx (rounded up))
Velocity at each xk: vk=min (√2αxk, vlim(xk))
Time length for arriving at xdec:

$$Tdec = TRPdel + \Sigma(2\Delta x/(vk + v(k+1)))\ (k = 0, ..., N-1)$$

Note that, as the time length for the releasing loading zone and the time length for arriving at the deceleration start position, for example, in cases such as a case where the same travel route is traveled repeatedly, ones that are calculated in advance can also be used by acquiring them as fixed values.

Figure 14:
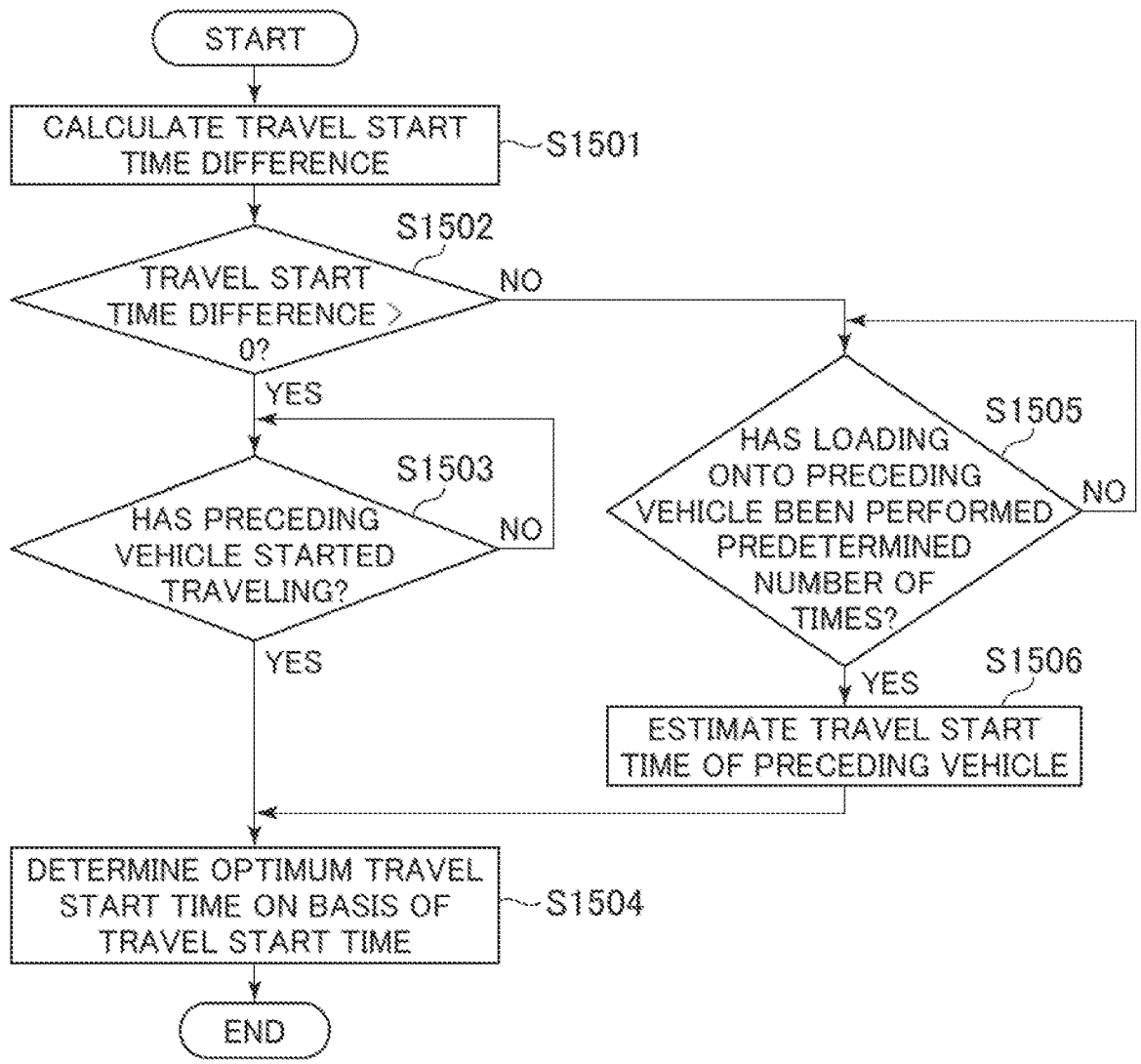
FIG. 14 is a flowchart depicting the processing content of a travel start time determination process.
Figure 15:
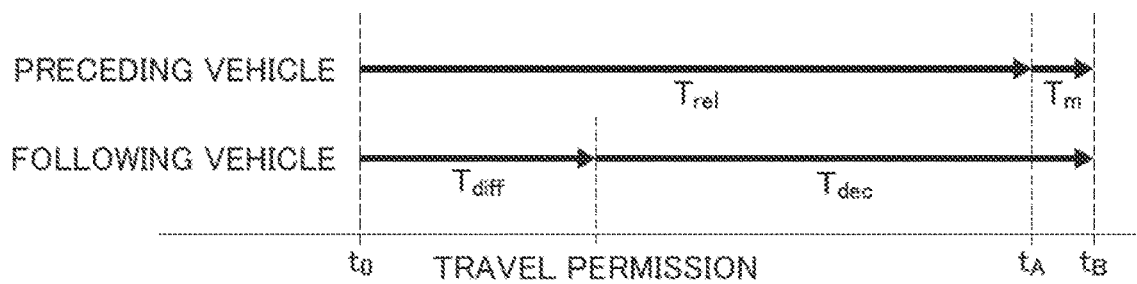
FIG. 15 is a figure for explaining a processing principle of the travel start time determination process.
Figure 16:
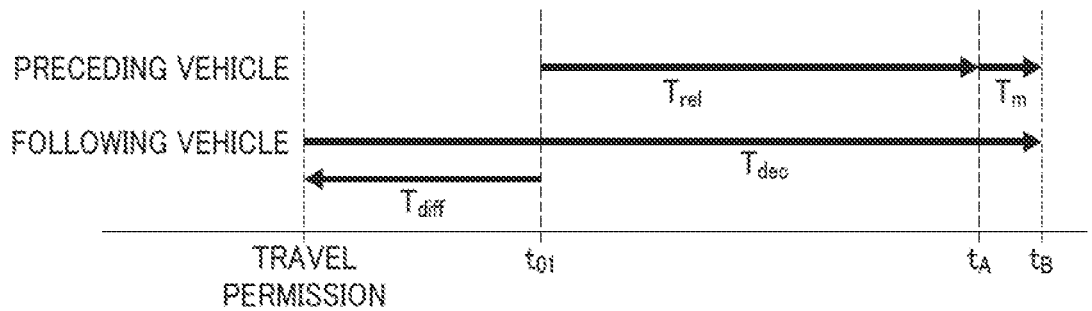
FIG. 16 is a figure for explaining the processing principle of the travel start time determination process.
Figure 17:
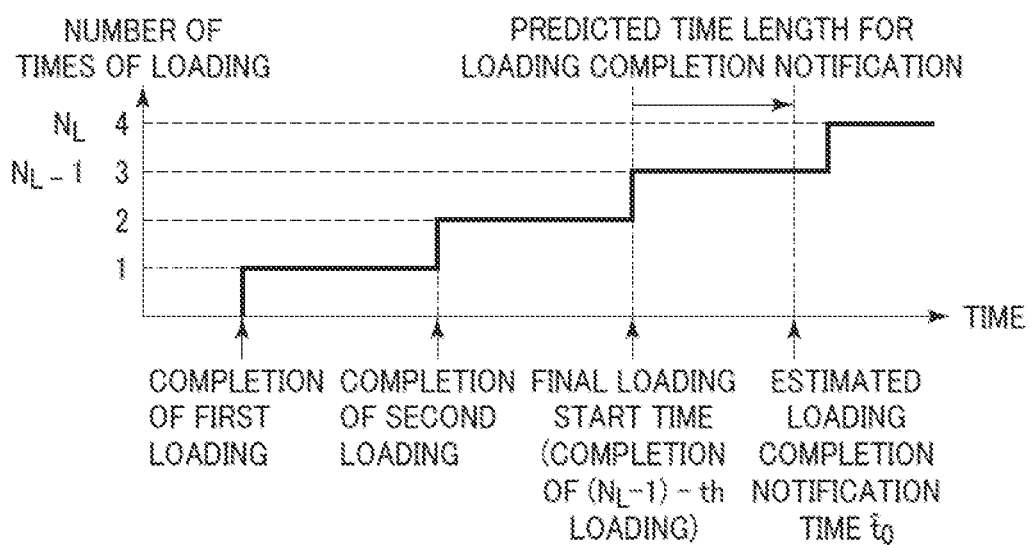
FIG. 17 is a figure for explaining the processing principle of the travel start time determination process.

FIG. 14 is a flowchart depicting the processing content of the travel start time determination process. In addition, FIG. 15 to FIG. 17 are figures for explaining a processing principle of the travel start time determination process.

As depicted in FIG. 14 to FIG. 17, in the travel start time determination process, a travel start time difference is calculated (Step S1501), and it is assessed whether or not the travel start time difference is greater than 0 (zero) (Step S1502).

In a case where the result of the assessment in Step S1502 is YES, that is, in a case where the travel start time difference is positive, it is assessed whether or not the preceding unmanned vehicle has started traveling (Step S1503). In a case where the assessment result is NO, the process in Step S1503 is repeated until the preceding unmanned vehicle starts traveling, that is, until the assessment result becomes YES. In addition, in a case where the result of the assessment in Step S1503 is YES, an optimum travel start time is determined on the basis of a travel start time (Step S1504), and the process is ended.

In addition, in a case where the result of the assessment in Step S1502 is NO, that is, in a case where the travel start time difference is negative, it is assessed whether or not loading actions have been performed a predetermined number of times for the preceding unmanned vehicle (Step S1505), and, in a case where the assessment result is NO, the process in Step S1505 is repeated until the assessment result becomes YES. In addition, in a case where the result of the assessment in Step S1505 is YES, that is, in a case where loading actions have been performed a predetermined number of times, a travel start time of the preceding unmanned vehicle is estimated (Step S1506), an optimum travel start time is determined on the basis of the estimated travel start time (Step S1504), and the process is ended.

Note that, in a case where the travel start time difference is positive, assuming that, as depicted in FIG. 15, a travel start time of the preceding vehicle is t0, the time length for arriving at the loading zone releasing position is Trel, the time length for arriving at the deceleration start position is Tdec, the travel start time difference is Tdiff, the loading zone releasing time is tA=t0+Trel, and the deceleration start time is tB=t0+Tdiff+Tdec, t0+Trel<tB=t0+Tdiff+Tdec holds true from tA<tB, which is a condition that the travel start time difference should satisfy, and Tdiff>Trel-Tdec is derived. Here, if a margin time length Tm is defined, a travel start time difference Tdiff is determined according to Trel-Tdec+Tm. In addition, in a case where the travel start time difference is negative, as depicted in FIG. 16, the travel start time difference Tdiff can be determined according to Trel-Tdec+Tm by using an estimated time t01 as the travel start time of the preceding vehicle.

In addition, as depicted in FIG. 17, a travel start time estimated in a case where the travel start time difference is negative can be determined by calculating the number of times of loading on the basis of vehicle size classes (each capacity is prestored) of a hydraulic excavator (the loading machine 10) and a dump truck (the unmanned vehicle 20). Specifically, the required number of times of loading N_L is determined according to (truck loading capacity)/(excavator bucket capacity) (rounded up), a final loading start time (a loading completion time of (N_L−1)-th loading) and a predicted time length for the loading completion notification (a time length from the final loading start time to a loading completion notification time) are defined, and an estimated loading completion notification time t01 is thereby calculated according to (final loading start time)+(predicted time length for the loading completion notification). The predicted time length for loading completion notification is learned on the basis of data of actual final loading start times and loading completion notification times, and a preset initial value is updated with the moving average value of recorded values. Note that the predicted time length for the loading completion notification may be learned independently for each combination of an operator and the vehicle size class of a hydraulic excavator.

Advantages of the present embodiment configured as described above are explained in comparison with a conventional technology.

Figure 21:
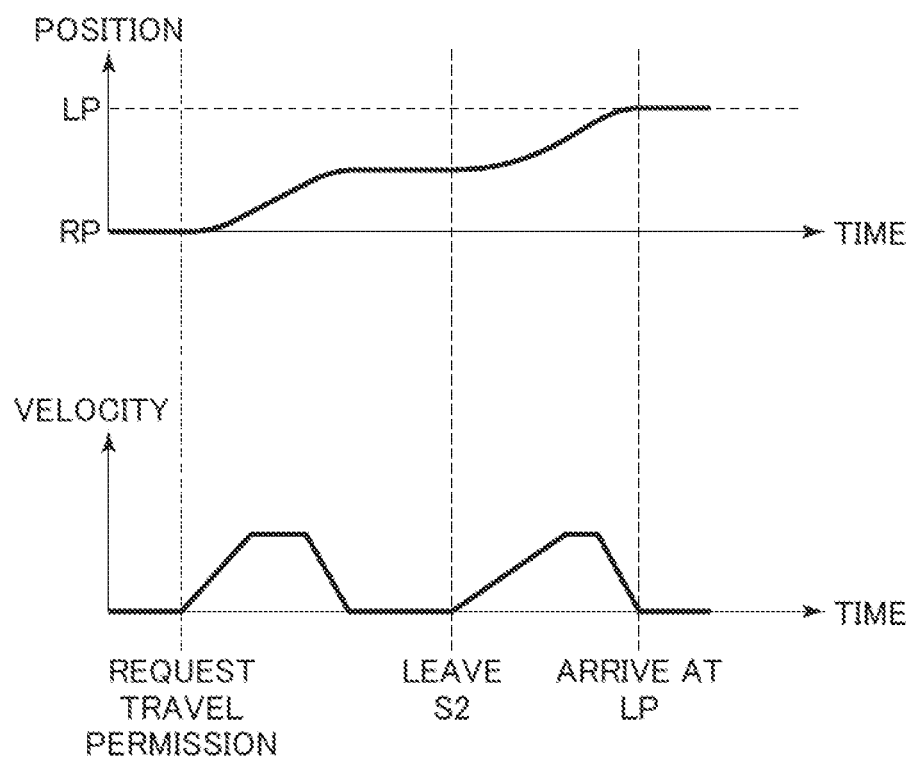
FIG. 21 is a figure depicting changes of the position and velocity of an unmanned vehicle.

FIG. 20 is a figure depicting a state of vehicle management in the conventional technology depicted as a comparative example, and FIG. 21 is a figure depicting changes of the position and velocity of an unmanned vehicle.

As depicted in FIG. 20 and FIG. 21, in the conventional technology, in a case where a preceding unmanned vehicle in the loading zone S2 and a following unmanned vehicle stopped at the queuing position in the queuing zone S1 start traveling simultaneously (state a), the following unmanned vehicle arrives at the boundary between the queuing zone S1 and the loading zone S2 undesirably before the preceding unmanned vehicle goes out of the exit zone S3 (i.e., before a travel permission regarding the loading zone S2 for the following unmanned vehicle is acquired), and accordingly it becomes necessary for the following unmanned vehicle to pause in the queuing zone S1 until the a travel permission regarding the loading zone S2 is obtained (state b). Then, when the preceding unmanned vehicle goes out of the exit zone S3, the following unmanned vehicle acquires a travel permission regarding the loading zone S2 (state c), enters the loading zone S2 from the queuing zone S1 while accelerating (state d), and decelerates promptly to arrive at the loading position (state e). That is, in the conventional technology, since the frequency of acceleration and deceleration of the following unmanned vehicle increases, the average velocity lowers, and the work efficiency deteriorates. Also, a time length required for replacement of unmanned vehicles at the loading position increases, and the productivity deteriorates undesirably.

Figure 18:
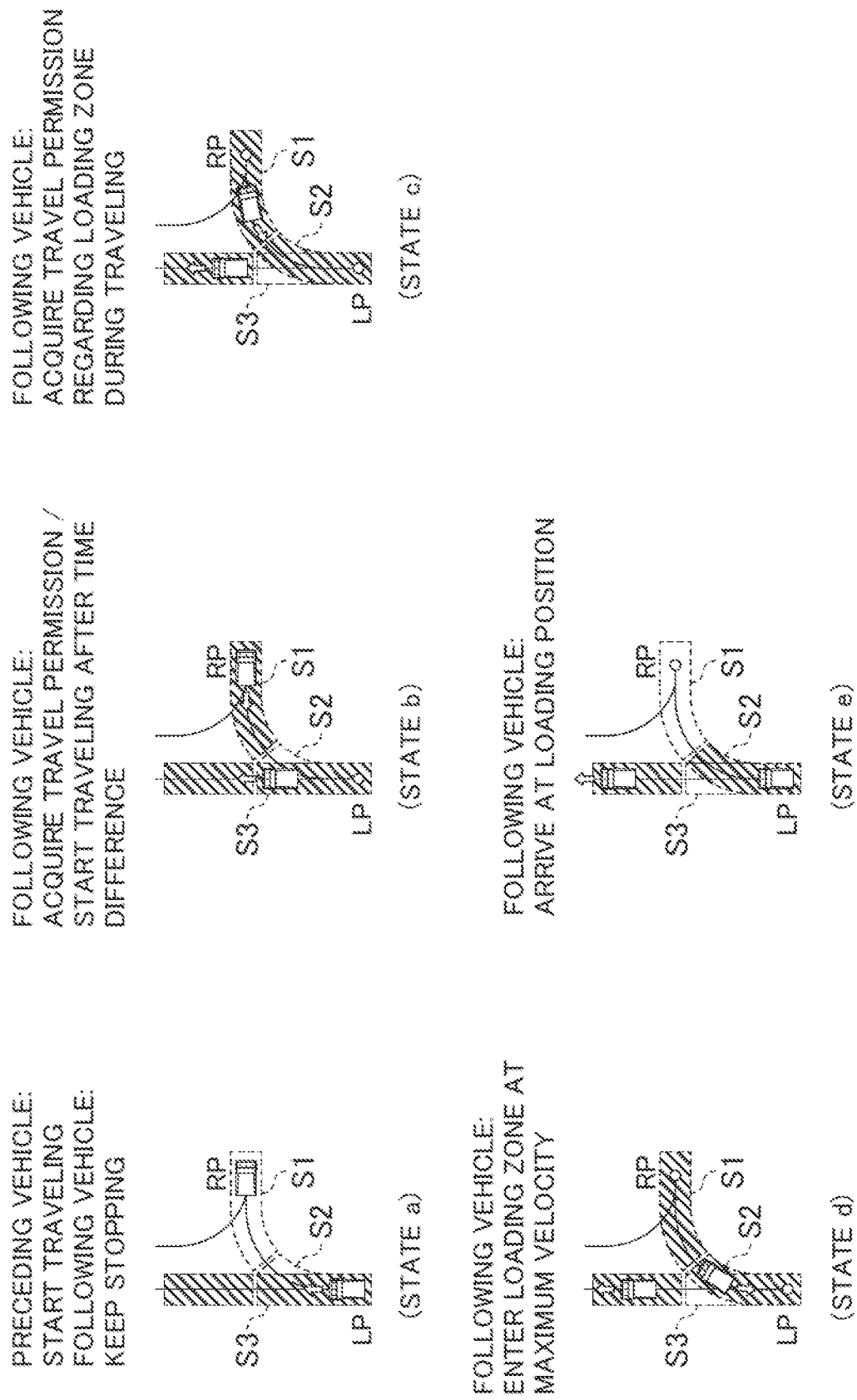
FIG. 18 is a figure depicting a state of vehicle management.
Figure 19:
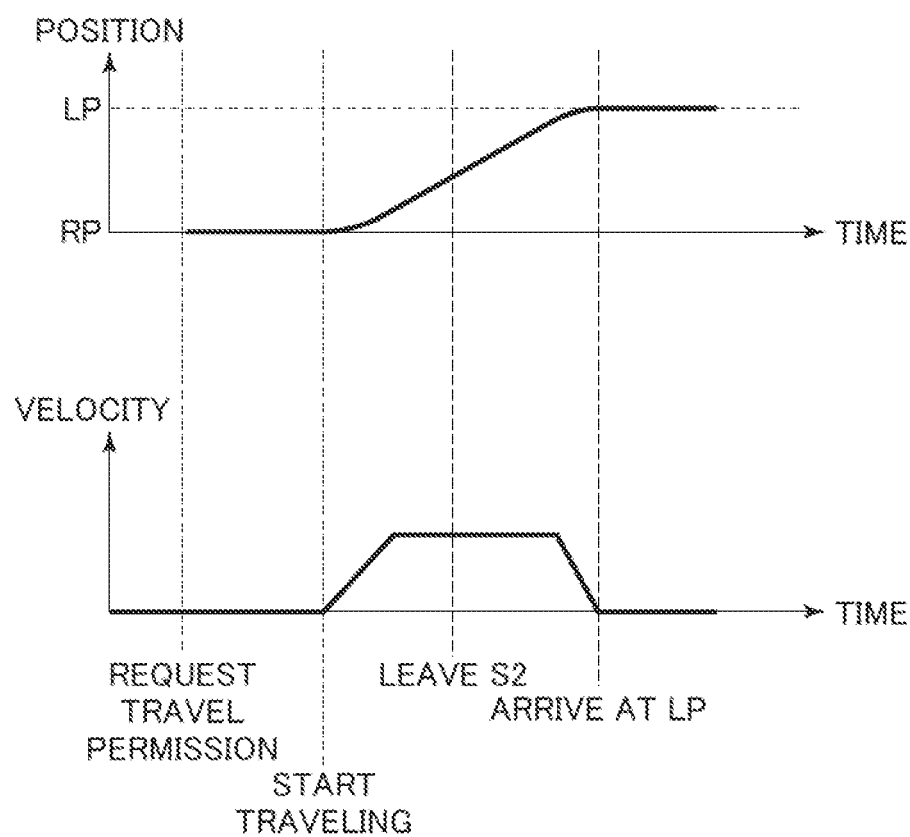
FIG. 19 is a figure depicting changes of the position and velocity of an unmanned vehicle.

FIG. 18 is a figure depicting a state of vehicle management in the present embodiment, and FIG. 19 is a figure depicting changes of the position and velocity of an unmanned vehicle.

As depicted in FIG. 18 and FIG. 19, in the present embodiment, in a state where a preceding unmanned vehicle in the loading zone S2 starts traveling from the loading position and a following unmanned vehicle keeps stopping at the queuing position in the queuing zone S1 (state a), according to a travel permission request regarding the queuing zone S1 from the following unmanned vehicle, a travel permission regarding the queuing zone S1 is issued after time corresponding to a time difference has elapsed from travel start of the preceding unmanned vehicle, and the following unmanned vehicle starts traveling (state b). At this time, the time difference between the travel start of the preceding unmanned vehicle and the travel start of the following unmanned vehicle is set optimally by the vehicle management system in the present embodiment, and the preceding unmanned vehicle goes out of the exit zone S3 while the following unmanned vehicle is traveling in the queuing zone S1 and before the following unmanned vehicle arrives at the deceleration start position. That is, in other words, the following unmanned vehicle acquires the travel permission regarding the loading zone S2 while traveling in the queuing zone S1 and before arriving at the deceleration start position (state c). Then, as a result, the following unmanned vehicle can enter the loading zone S2 and arrive at the loading position in a shorter time length from the issuance of the travel permission regarding the loading zone S2 and at the maximum velocity (velocity limit) without decelerating in the queuing zone S1 (state d, state e). Accordingly, a time length required for replacement of unmanned vehicles at the loading position can be shortened, and the productivity can be enhanced.

Second Embodiment

A second embodiment of the present invention is explained with reference to FIG. 22 and FIG. 23. Note that constituent elements and the like in the present embodiment that are similar to those in the first embodiment are given the same reference characters, and explanations thereof are omitted as appropriate.

In the case depicted in the present embodiment, such an optimum traveling velocity (velocity limit) that a time length for travel in the loading zone is minimized is applied to a following unmanned vehicle.

Figure 22:
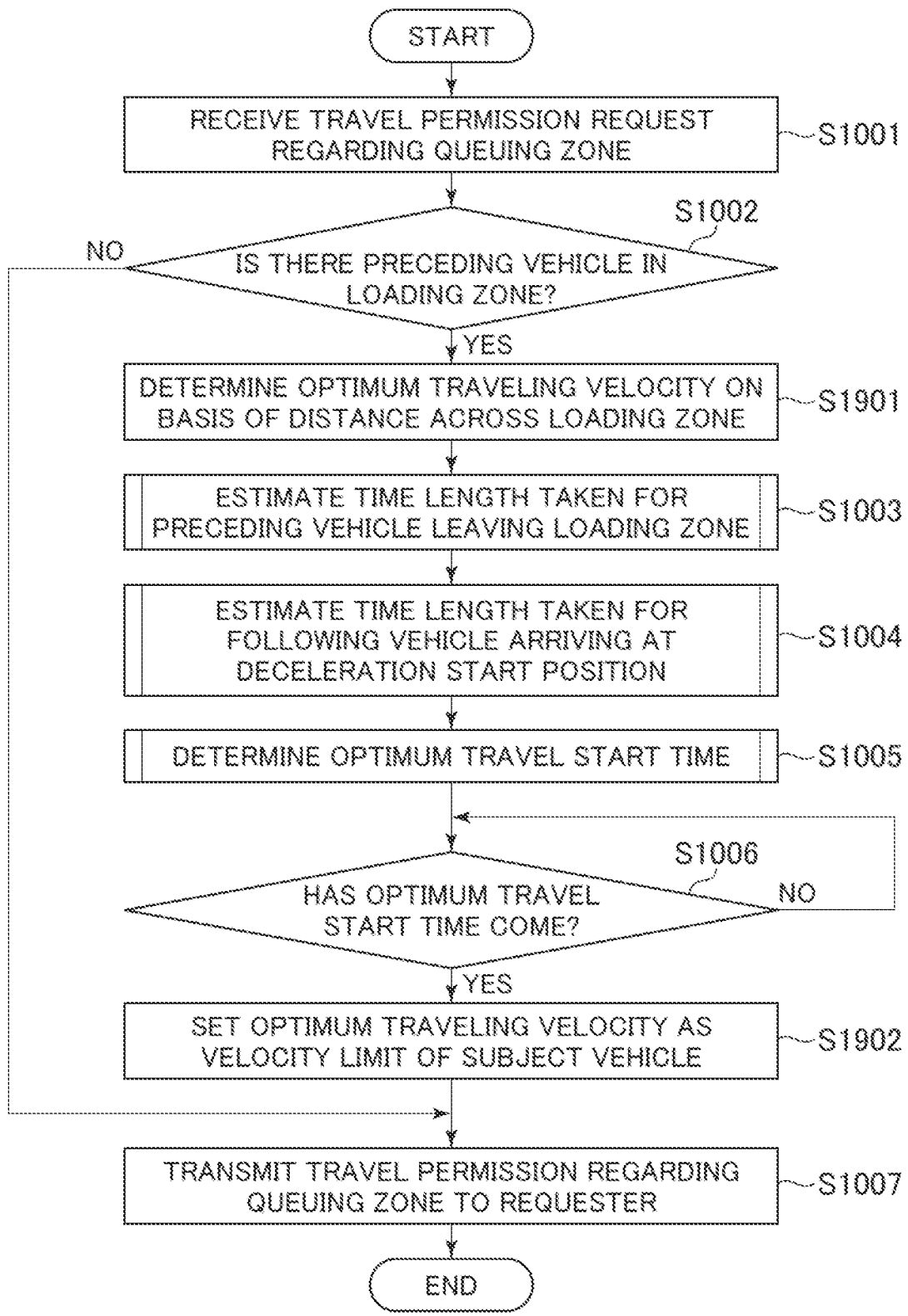
FIG. 22 is a flowchart depicting the processing content of the process of giving permission of travel start, the process being performed by the traffic management controller according to a second embodiment.

FIG. 22 is a flowchart depicting the processing content of the process of giving permission of travel start, the process being performed by the traffic management controller according to the present embodiment. In addition, FIG. 23 is a figure for explaining a calculation principle of the optimum traveling velocity in the present embodiment.

In FIG. 22, when the traffic management controller 310 receives a travel permission request regarding the queuing zone S1 from the unmanned vehicle 20-2 stopped at the queuing position of the queuing zone S1 (Step S1001), the traffic management controller 310 assesses whether or not there is the preceding unmanned vehicle 20-1 in the loading zone S2 (Step S1002). In a case where the assessment result is NO, that is, in a case where there is not the preceding unmanned vehicle 20-1 in the loading zone, the traffic management controller 310 transmits a travel permission regarding the queuing zone S1 to the unmanned vehicle 20-2 (Step S1007), and ends the process.

In addition, in a case where the result of the assessment in Step S1002 is YES, that is, in a case where there is the preceding unmanned vehicle 20-1 in the loading zone S2, the substitute vehicle travel-start time calculating section 313 implements an optimum traveling velocity determination process of determining an optimum traveling velocity (optimum traveling velocity) of the following unmanned vehicle 20-2 on the basis of a distance across (length of) the loading zone S2 (Step S1901), implements the estimation process of estimating a time length taken for the preceding unmanned vehicle 20-1 going out of the exit zone S3 and in which the loading zone S2 is released (Step S1003), implements the estimation process of estimating a time length taken for the unmanned vehicle 20-2 arriving at a deceleration start position where the unmanned vehicle 20-2 should start decelerating for stopping before entering the loading zone S2 after starting traveling from the queuing position (Step S1004), and implements the travel start time determination process of determining a travel start time of the unmanned vehicle 20-2 on the basis of a reception time of the loading completion notification to the unmanned vehicle 20-1 and a travel start time difference (Step S1005).

Subsequently, the traffic management controller 310 assesses whether or not the travel start time calculated in Step S1005 has come (Step S1006), and, in a case where the assessment result is NO, repeats the process in Step S1006 until the assessment result becomes YES, that is, until the travel start time has come. In addition, in a case where the assessment result in Step S1006 is YES, that is, in a case where the travel start time has come, the optimum traveling velocity is applied as the velocity limit of the subject unmanned vehicle 20 (Step S1902), a travel permission regarding the queuing zone S1 is transmitted to the unmanned vehicle 20-2 (Step S1007), and the process is ended.

Figure 23:
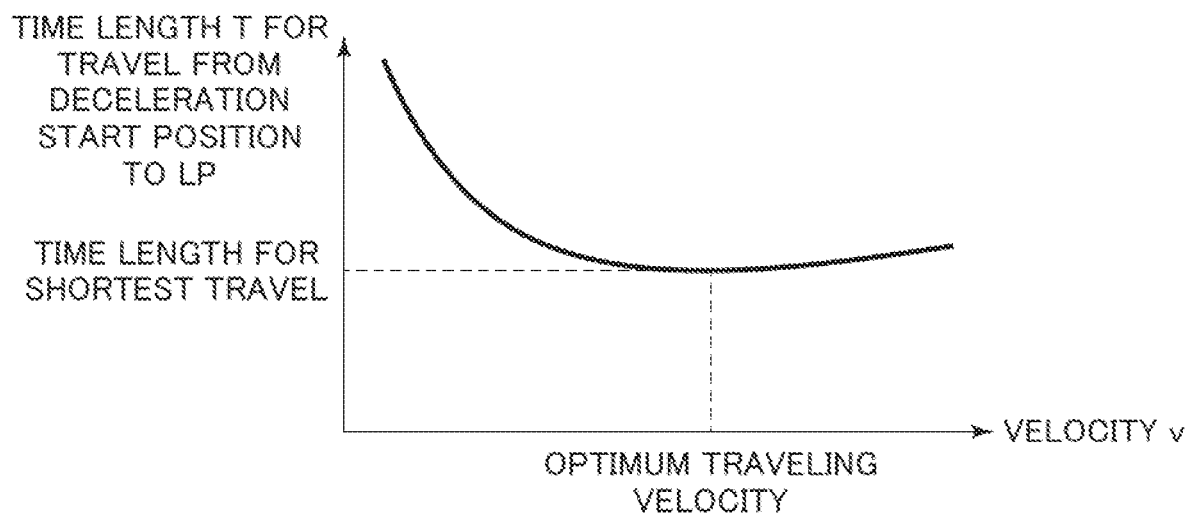
FIG. 23 is a figure for explaining a calculation principle of an optimum traveling velocity according to the second embodiment.

As depicted in FIG. 23, there is a trade-off relationship between a traveling velocity v (velocity limit) of the following unmanned vehicle 20-2 and a time length T for travel taken until the unmanned vehicle 20-2 traveling in the loading zone S2 arrives at the loading position LP, which is a stop position, from the deceleration start position. This is because, as the traveling velocity v of the unmanned vehicle 20-2 increases, a distance Lstop from the deceleration start position (the distance from the deceleration start position to the loading position LP) increases, and the traveled distance required for the unmanned vehicle 20-2 to decelerate and stop increases. On the other hand, as depicted in FIG. 23, there is a traveling velocity (optimum traveling velocity) of an unmanned vehicle that minimizes the time length T for travel.

Here, assuming that the velocity of entry of the following unmanned vehicle 20-2 from the queuing zone S1 to the loading zone S2 is v0, the deceleration from the deceleration start position to the loading position is β, a stop margin is Lmargin, and the distance across (length of) the loading zone S1 is LS2, the optimum traveling velocity is determined in the following manner.

Distance from deceleration start position to loading position (distance from deceleration start position): L (v0)

$$T(v01) = 2\sqrt{((Lmargin + LS2)/\beta)}$$

time length for travel at distance from deceleration start position: T (v0)

$$L(v0) = v0^2/2\beta + Lmargin + LS2$$

Optimum traveling velocity: v01
v01=√β(Lmargin+LS2) (from the inflection point of T (v0))
Shortest time length for travel: v01

$$T(v0) = L(v0)/v0 + v0/2\beta = v0/\beta + (Lmargin + LS2)/v0$$

In other respects, the configuration is similar to that of the first embodiment.

Also in the present embodiment configured as described above, advantages similar to those in the first embodiment can be attained.

In addition, by applying the optimum traveling velocity as the velocity limit, it is possible to further shorten a time length required for replacement of unmanned vehicles at the loading position and enhance productivity.

Modification Example of Second Embodiment

A modification example of the second embodiment of the present invention is explained with reference to FIG. 24. Note that constituent elements and the like in the present modification example that are similar to those in the second embodiment are given the same reference characters, and explanations thereof are omitted as appropriate.

In the case depicted in the present embodiment, such an optimum traveling velocity (velocity limit) that the fuel consumption in the loading zone is minimized is applied to a following unmanned vehicle.

Figure 24:
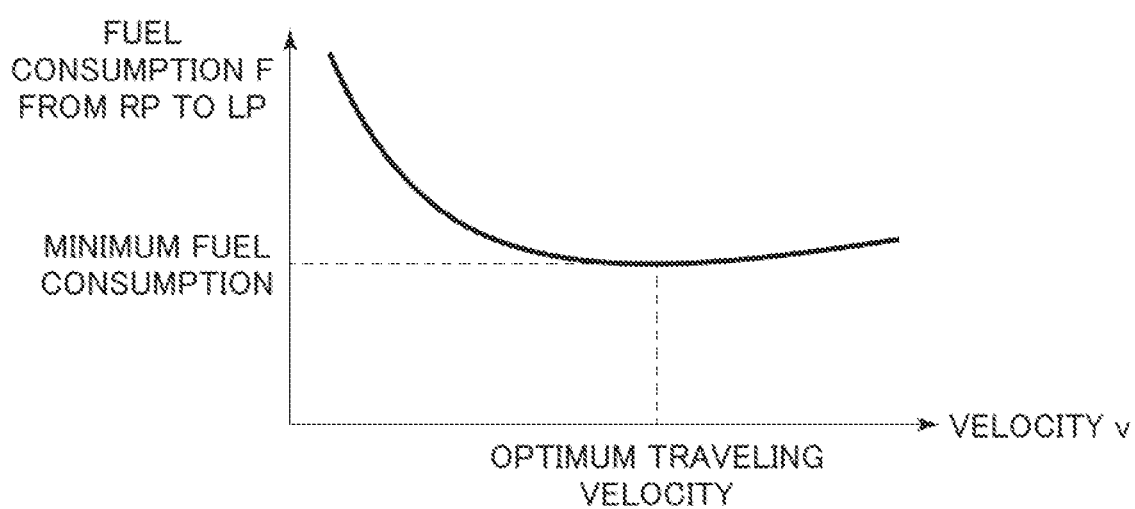
FIG. 24 is a figure for explaining a calculation principle of the optimum traveling velocity according to a modification example of the second embodiment.

FIG. 24 is a figure for explaining a calculation principle of the optimum traveling velocity according to the present modification example.

As depicted in FIG. 24, there is a trade-off relationship between the traveling velocity v (velocity limit) of the following unmanned vehicle 20-2 and fuel consumption F consumed until the unmanned vehicle 20-2 traveling in the loading zone S2 arrives at the loading position LP, which is a stop position, from the deceleration start position. This is because, as the traveling velocity v of the unmanned vehicle 20-2 increases, the unmanned vehicle 20-2 can travel in a shorter time length but the fuel consumption worsens and, as the traveling velocity v decreases, the fuel consumption is improved but the time length for travel of the unmanned vehicle 20-2 becomes longer. On the other hand, as depicted in FIG. 24, there is a traveling velocity (optimum traveling velocity) of an unmanned vehicle that minimizes the fuel consumption F. In the present modification example, this optimum traveling velocity is applied as the velocity limit of the following unmanned vehicle 20-2.

In other respects, the configuration is similar to that of the second embodiment.

Also in the present modification example configured as described above, advantages similar to those in the second embodiment can be attained.

In addition, by applying the optimum traveling velocity as the velocity limit, the fuel consumption can be enhanced.

Note that, whereas the optimum traveling velocity is calculated on the basis of the relationship between the traveling velocity and the fuel consumption in the present modification example, this is not the sole example. For example, using an evaluation function in which a function T(v0) of a time length for travel related to the velocity v0 and a function F(v0) of the fuel consumption are given weights, such an optimum traveling velocity that the time length for travel and the fuel consumption are minimized may be calculated. In addition, in another manner of the configuration, such an optimum speed of rotation of the engine that the fuel consumption is minimized is calculated.

Third Embodiment

A third embodiment of the present invention is explained with reference to FIG. 25. Note that constituent elements and the like in the present embodiment that are similar to those in the first embodiment are given the same reference characters, and explanations thereof are omitted as appropriate.

In the case depicted in the present embodiment, the time length for releasing the loading zone is updated according to the travel state of the preceding unmanned vehicle such as its position or velocity, and the travel start time difference Tdiff is updated according to the updated time length for releasing the loading zone.

Figure 25:
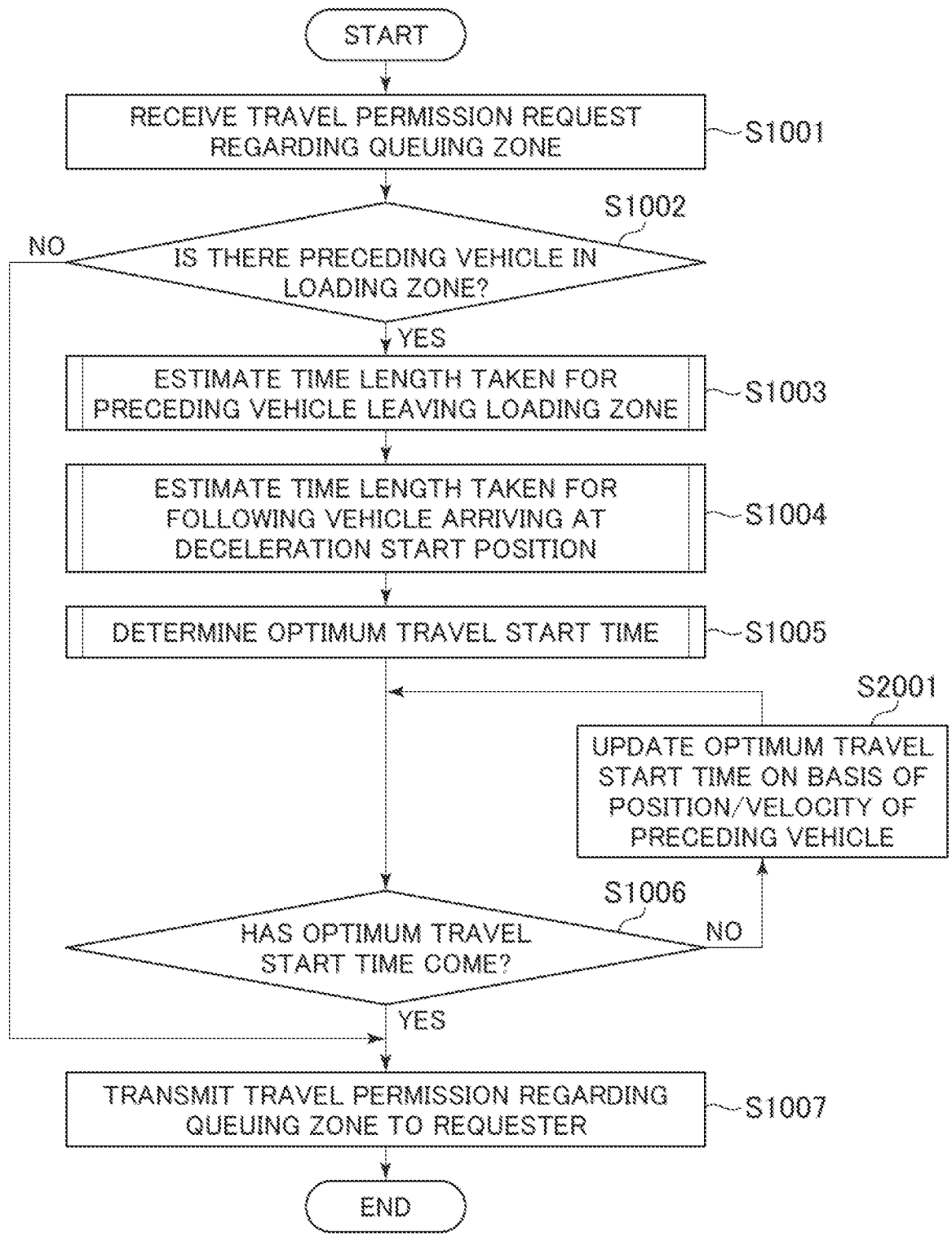
FIG. 25 is a flowchart depicting the processing content of the process of giving permission of travel start, the process being performed by the traffic management controller according to a third embodiment.

FIG. 25 is a flowchart depicting the processing content of the process of giving permission of travel start, the process being performed by the traffic management controller according to the present embodiment.

In FIG. 25, when the traffic management controller 310 receives a travel permission request regarding the queuing zone S1 from the unmanned vehicle 20-2 stopped at the queuing position of the queuing zone S1 (Step S1001), the traffic management controller 310 assesses whether or not there is the preceding unmanned vehicle 20-1 in the loading zone S2 (Step S1002). In a case where the assessment result is NO, that is, in a case where there is not the preceding unmanned vehicle 20-1 in the loading zone, the traffic management controller 310 transmits a travel permission regarding the queuing zone S1 to the unmanned vehicle 20-2 (Step S1007), and ends the process.

In addition, in a case where the result of the assessment in Step S1002 is YES, that is, in a case where there is the preceding unmanned vehicle 20-1 in the loading zone S2, the substitute vehicle travel-start time calculating section 313 implements the estimation process of estimating a time length which is taken for the preceding unmanned vehicle 20-1 going out of the exit zone S3 and after which the loading zone S2 is released (Step S1003), implements the estimation process of estimating a time length taken for the unmanned vehicle 20-2 arriving at a deceleration start position where the unmanned vehicle 20-2 should start decelerating for stopping before entering the loading zone S2 after starting traveling from the queuing position (Step S1004), and implements the travel start time determination process of determining a travel start time of the unmanned vehicle 20-2 on the basis of a reception time of the loading completion notification to the unmanned vehicle 20-1 and a travel start time difference (Step S1005).

Subsequently, the traffic management controller 310 assesses whether or not the travel start time calculated in Step S1005 has come (Step S1006). In a case where the assessment result is NO, the traffic management controller 310 updates the time length Trel for releasing the loading zone, on the basis of the position or velocity of the preceding vehicle. In a case where the travel start time difference Tdiff calculated according to the updated time length Trel for releasing the loading zone is smaller than the previously-updated travel start time difference Tdiff, the traffic management controller 310 updates the optimum travel start time with the calculated value based on the travel start time difference Tdiff (Step S2001), and returns to the process in Step S1006.

In addition, in a case where the assessment result in Step S1006 is YES, that is, in a case where the travel start time has come, the optimum traveling velocity is applied as the velocity limit of the subject unmanned vehicle 20 (Step S1902), and the process is ended.

In other respects, the configuration is similar to that of the first embodiment.

Also in the present embodiment configured as described above, advantages similar to those in the first embodiment can be attained.

In addition, by updating the optimum travel start time such that it is optimized, it is possible to further shorten a time length required for replacement of unmanned vehicles at the loading position and enhance productivity.

Fourth Embodiment

A fourth embodiment of the present invention is explained with reference to FIG. 26 and FIG. 27. Note that constituent elements and the like in the present embodiment that are similar to those in the first embodiment are given the same reference characters, and explanations thereof are omitted as appropriate.

In the case depicted in the present embodiment, a travel permission (travel start permission) regarding the queuing zone for a following unmanned vehicle is issued on the basis of the position of a preceding unmanned vehicle in the loading zone.

Figure 26:
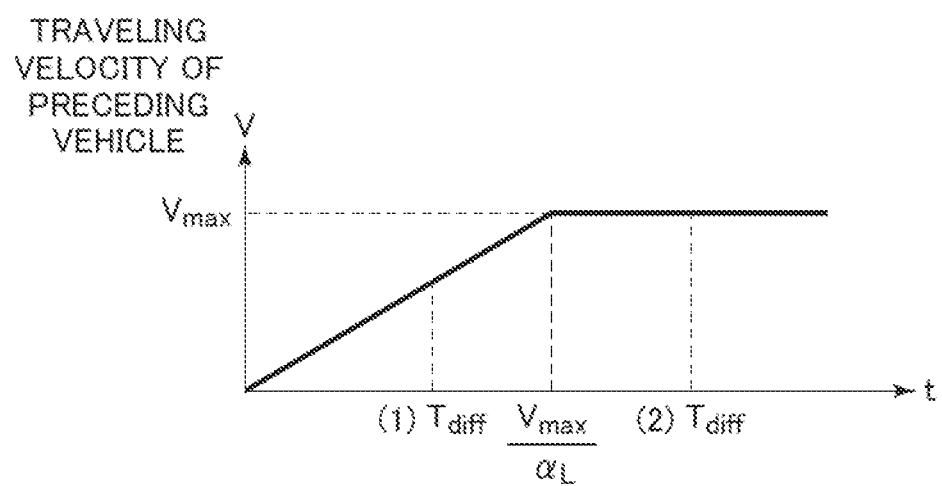
FIG. 26 is a figure for explaining a processing principle of travel permission output according to a fourth embodiment.

FIG. 26 is a figure for explaining a processing principle of travel permission output in the present embodiment.

As depicted in FIG. 26, the following unmanned vehicle 20-2 in the queuing zone S1 starts traveling with a delay of the "travel start time difference" after the preceding unmanned vehicle 20-1 in the loading zone S2 has started traveling, and accordingly the position (target arrival position) at which the preceding unmanned vehicle 20-1 arrives after the "travel start time difference" can be identified. Then, by triggering travel start of the following unmanned vehicle 20-2 (i.e., by triggering issuance of a travel permission) upon the arrival of the preceding unmanned vehicle 20-1 at the target arrival position, actions similar to those in the first embodiment can be realized. That is, in the present embodiment, by using the position of the preceding unmanned vehicle as a trigger instead of a time length (time), actions similar to those in the first embodiment are realized.

Here, assuming that the acceleration of the preceding unmanned vehicle 20-1 is $\alpha L$ and the maximum velocity of the preceding unmanned vehicle 20-1 is vmax, the target arrival position is calculated in the following manner according to (travel start time difference Tdiff)=Trel−Tdec+Tm.

That is, in a case of (1) Tdiff≤vmax/$\alpha L$ in FIG. 26, the target arrival position is $\alpha L \times$Tdiff⌃2. In addition, in a case of (2) Tdiff>vmax/$\alpha L$, the target arrival position is vmax×Tdiff−vmax⌃2/2$\alpha L$.

Figure 27:
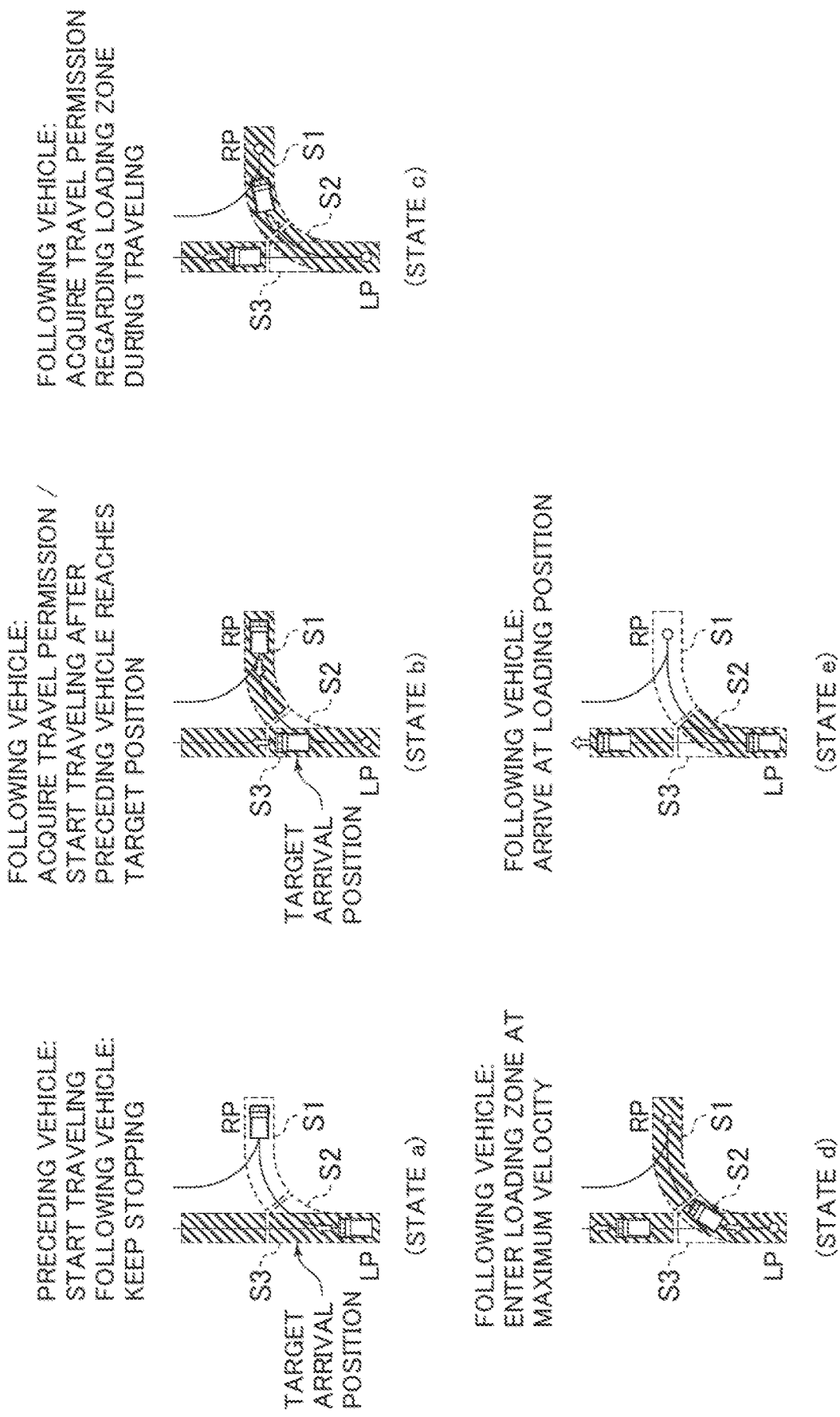
FIG. 27 is a figure depicting a state of vehicle management according to the fourth embodiment.

FIG. 27 is a figure depicting a state of vehicle management according to the present embodiment.

As depicted in FIG. 27, in the present embodiment, in a state where a preceding unmanned vehicle in the loading zone S2 starts traveling from the loading position and a following unmanned vehicle keeps stopping at the queuing position of the queuing zone S1 (state a), a travel permission regarding the queuing zone S1 is issued for the following unmanned vehicle when the preceding unmanned vehicle has arrived at the target arrival position in the exit zone S3, and the following unmanned vehicle starts traveling (state b). At this time, the time difference between the travel start of the preceding unmanned vehicle and the travel start of the following unmanned vehicle is set such that the time difference is optimized by the vehicle management system as in the first embodiment, and the preceding unmanned vehicle goes out of the exit zone S3 while the following unmanned vehicle is traveling in the queuing zone S1 and before arriving at the deceleration start position. That is, in other words, the following unmanned vehicle acquires the travel permission regarding the loading zone S2 while traveling in the queuing zone S1 and before arriving at the deceleration start position (state c). Then, as a result, the following unmanned vehicle can enter the loading zone S2 and arrive at the loading position in a shorter time length from the issuance of the travel permission regarding the loading zone S2 and at the maximum velocity (velocity limit) without decelerating in the queuing zone S1 (state d, state e). Accordingly, a time length required for replacement of unmanned vehicles at the loading position can be shortened, and the productivity can be enhanced.

In other respects, the configuration is similar to that of the first embodiment.

Also in the present embodiment configured as described above, advantages similar to those in the first embodiment can be attained.

Fifth Embodiment

A fifth embodiment of the present invention is explained with reference to FIG. 28. Note that constituent elements and the like in the present embodiment that are similar to those in the first embodiment are given the same reference characters, and explanations thereof are omitted as appropriate.

Note that, in the case depicted in the present embodiment, the loading position and the queuing position are set not as turn around positions where unmanned vehicles 20 turn around to switch to forward movement or backward movement, but as stop passing positions where the unmanned vehicles 20 enter from one side and exit from the other side.

Figure 28:
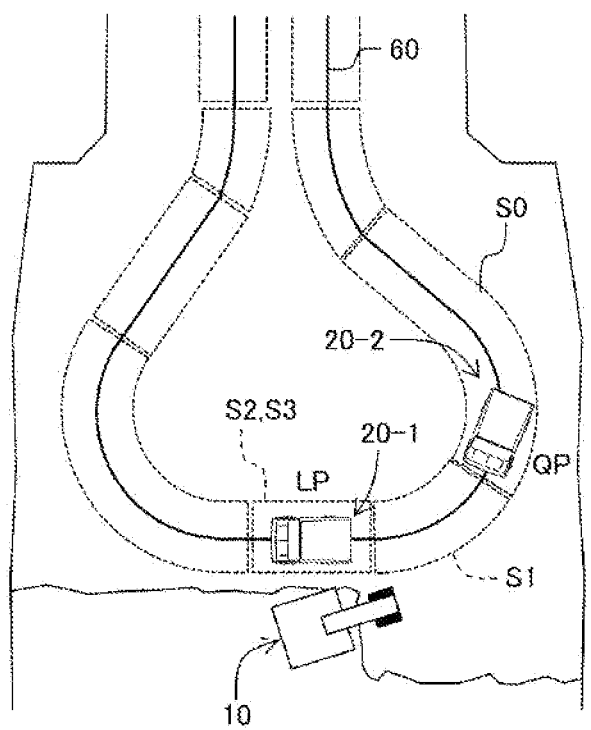
FIG. 28 is a figure depicting an example of a travel route according to a fifth embodiment.

FIG. 28 is a figure depicting an example of a travel route in the present embodiment.

As depicted in FIG. 28, on the travel route 60, a travel zone so is a queuing zone S0 where the unmanned vehicle 20-2 heading toward the loading position queues, and, at an end section thereof, the queuing position (QP: Queuing Point) set as a stop passing position is arranged. In addition, the travel zone S1 is an approach zone S1 where the following unmanned vehicle 20-2 having started traveling from the queuing position QP in the queuing zone S0 travels when entering the loading exit zones S2 and S3. In addition, the travel zones S2 and S3 are the loading exit zones S2 and S3 combining features of both the loading zone S2 and the exit zone S3 in the first embodiment, and includes the loading position (LP: Loading Point) set as a stop passing position. A common travel permission is given regarding the loading exit zones S2 and S3, and only one unmanned vehicle can enter the loading exit zones S2 and S3 at once.

In the present embodiment configured as described above, by treating the approach zone S1 and the loading exit zone S2 and S3 together similarly to the loading zone S2 and the exit zone S3 of the first embodiment, actions similar to those in the first embodiment can be performed.

In other respects, the configuration is similar to that of the first embodiment.

Also in the present embodiment configured as described above, advantages similar to those in the first embodiment can be attained.

Note that, in the work area which is depicted in FIG. 28 and where the loading work is performed, the route from the entrance position to the loading position LP and the route from the loading route LP to the exit position may be considered as separate routes, the travel zone S2 and the travel zone S3 may be generated independently, and the loading position LP may be set at a position where the travel zone S2 and the travel zone S3 overlap.

Supplementary Notes

Note that the present invention is not limited to the embodiments described above, and includes various modification examples and combinations within the scope not departing from the gist of the present invention. In addition, the present invention is not limited to those including all the constituent elements explained in the embodiments described above, and also includes those from which some of the constituent elements are deleted.

In addition, some or all of the constituent elements, functions, and the like described above may be realized by designing them, for example, in an integrated circuit. In addition, the constituent elements, functions, and the like described above may be realized by software by a processor interpreting and executing a program to realize respective functions.

DESCRIPTION OF REFERENCE CHARACTERS

10: Loading machine (hydraulic excavator)
10A: Front device
10B: Upper swing structure
10C: Lower travel structure
20: Unmanned vehicle (dump truck)
30: Traffic management station
40: Wireless communication line
41: Wireless base station
60: Travel route (transportation route)
100: Vehicle management system
140: Wireless communication device
170: Loading completion notification input device
171: Vehicle body operation input device (operation lever)
172: Operator's seat
180: Vehicle body drive system
191: Boom
192: Arm
193: Bucket
194: Boom cylinder
195: Arm cylinder
196: Bucket cylinder
197: Operation room
200: Unmanned vehicle controller
201: Autonomous travel control section
202: Vehicle body information managing section
203: Travel permission requesting section
210: Travel drive system
220: Position/orientation sensor
230: Velocity sensor
240: Wireless communication device
250: Storage device
251: Map information storage section
270: Loading sensor
281: Vehicle body frame
282L, 282R: Follower wheel
283L, 283R: Driving wheel
284: Operation room
285: Cargo bed (vessel)
285a: Pin-joining section
286: Hoist cylinder
289: Fuel tank
290L, 290R: Travel motor
310: Traffic management controller
311: Vehicle allocation managing section
312: Traffic management control section
313: Substitute vehicle travel-start time calculating section
340: Wireless communication device
350: Traffic management storage device
351: Vehicle allocation management information storage section
352: Traffic management information storage section
353: Map information storage section

The invention claimed is:

1. A vehicle management system in which a plurality of unmanned vehicles including at least a first unmanned vehicle and a second unmanned vehicle that haul to-be-hauled objects and are capable of traveling autonomously, a loading machine that performs loading work of loading the to-be-hauled objects onto each of the plurality of unmanned vehicles, and a traffic management station that performs traffic management control of the loading machine and the plurality of unmanned vehicles are wirelessly connected to each other in a mutually communicable manner, the vehicle management system comprising:

an unmanned vehicle controller that acquires vehicle body information including positional information representing positions of the plurality of unmanned vehicles at a work site and orientation information representing orientations of the plurality of unmanned vehicles at the work site, controls autonomous traveling of the plurality of unmanned vehicles on a basis of a travel permission for the plurality of unmanned vehicles, and outputs a travel permission request for requesting a travel permission, for each of the plurality of unmanned vehicles, regarding a predetermined travel zone among a plurality of travel zones included in a travel route where the plurality of unmanned vehicles travel;

a loading completion notification input device that outputs, according to input operation by an operator of the loading machine, a loading completion notification indicating that loading work of loading the to-be-hauled objects onto corresponding one of the unmanned vehicles that is stopped at a loading position preset on the travel route as a position where the loading work is performed by the loading machine for the unmanned vehicles has been completed; and a traffic management controller that sets a travel route where the plurality of unmanned vehicles travel, on a basis of a work schedule predetermined for the work site and map information including information regarding positions and velocity limits of a plurality of travel routes and that outputs a travel permission regarding a predetermined travel zone of the travel route set for the plurality of unmanned vehicles, on a basis of a travel permission request from the unmanned vehicle controller, wherein the traffic management controller is configured to, in a case where a loading zone which is a travel zone including the loading position and in which only one unmanned vehicle is allowed to enter at once and a queuing zone which is a travel zone adjacent to the loading zone and in which an unmanned vehicle heading toward the loading zone queues are set, and where a travel permission request regarding the queuing zone by the first unmanned vehicle stopped in the queuing zone is received, calculate such a travel start time difference between the first unmanned vehicle and the second unmanned vehicle positioned in the loading zone that the second unmanned vehicle goes out of the loading zone a predetermined spare time length before the first unmanned vehicle arrives at a deceleration start position where the first unmanned vehicle should start decelerating for stopping before entering the loading zone, on a basis of a time length for arriving at the deceleration start position that is a time length taken for the first unmanned vehicle arriving at the deceleration start position after starting traveling, and on a basis of a time length for arriving at a loading zone releasing position that is a time length taken for the second unmanned vehicle going out of the loading zone after starting traveling in response to reception of the loading completion notification to the second unmanned vehicle, calculate a travel start time of the first unmanned vehicle on a basis of a reception time of the loading completion notification to the second unmanned vehicle and the travel start time difference, and output a travel permission regarding the queuing zone for the first unmanned vehicle after the travel start time has come.

2. The vehicle management system according to claim 1, wherein each of the plurality of unmanned vehicles has the unmanned vehicle controller, the loading machine has the loading completion notification input device, and the traffic management station has the traffic management controller.

3. The vehicle management system according to claim 1, wherein the traffic management controller is configured to calculate the number of times of loading actions that is necessary until loading work for the second unmanned vehicle is completed, on a basis of a loaded amount of the to-be-hauled objects loaded onto the second unmanned vehicle at one loading action by the loading machine and a planned loaded amount of the second unmanned vehicle, estimate a reception time of the loading completion notification on a basis of the number of times of loading actions and a loading action start time in a case where the travel start time difference is negative, calculate a travel start time of the first unmanned vehicle on a basis of the estimated reception time of the loading completion notification and the travel start time difference, and output a travel permission regarding the queuing zone for the first unmanned vehicle after the travel start time has come.

4. The vehicle management system according to claim 3, wherein the traffic management controller is configured to estimate the reception time of the loading completion notification on a basis of a pre-learned time difference between a loading time and the reception time of the loading completion notification.

5. The vehicle management system according to claim 1, wherein the traffic management controller is configured to set a velocity of entry of the first unmanned vehicle into the loading zone.

6. The vehicle management system according to claim 5, wherein the traffic management controller is configured to set the velocity of entry of the first unmanned vehicle into the loading zone on a basis of a distance across the loading zone.

7. The vehicle management system according to claim 5, wherein the traffic management controller is configured to set the velocity of entry of the first unmanned vehicle into the loading zone such that a time length for travel in the loading zone is minimized.

8. The vehicle management system according to claim 1, wherein the traffic management controller is configured to, in a case where a loading zone which is a travel zone including the loading position and in which only one of the unmanned vehicles is allowed to enter at once and a queuing zone which is a travel zone adjacent to the loading zone and in which corresponding one of the unmanned vehicles heading toward the loading zone queues are set, and where a travel permission request regarding the queuing zone for the first unmanned vehicle stopped in the queuing zone is received, calculate such a travel start time difference between the first unmanned vehicle and the second unmanned vehicle positioned in the loading zone that the second unmanned vehicle goes out of the loading zone a predetermined spare time length before the first unmanned vehicle arrives at a deceleration start position where the first unmanned vehicle should start decelerating for stopping before entering the loading zone, on a basis of a time length for arriving the deceleration start position that is a time length taken for the first unmanned vehicle arriving at the deceleration start position after starting traveling, and on a basis of a time length for arriving at a loading zone releasing position that is a time length taken for the second unmanned vehicle going out of the loading zone after starting traveling in response to reception of the loading completion notification to the second unmanned vehicle, calculate a target arrival position where the second unmanned vehicle arrives after the travel start time difference, and output a travel permission regarding the queuing zone for the first unmanned vehicle when the second unmanned vehicle arrives at the target arrival position.

\* \* \* \* \*